United States Patent [19]

Leone

[11] Patent Number: 4,922,503

[45] Date of Patent: May 1, 1990

[54] LOCAL AREA NETWORK BRIDGE

[75] Inventor: Mario J. Leone, Cinnaminson, N.J.

[73] Assignee: Infotron Systems Corporation, Cherry Hill, N.J.

[21] Appl. No.: 264,134

[22] Filed: Oct. 28, 1988

[51] Int. Cl.$^5$ .............................................. H04J 3/00
[52] U.S. Cl. ............................. 370/85.13; 370/85.12
[58] Field of Search ....................... 370/85, 86, 88, 89, 370/58, 85.12, 85.13, 85.14, 85.9

[56] References Cited

U.S. PATENT DOCUMENTS

| | | | |
|---|---|---|---|
| 4,466,060 | 8/1984 | Riddle | 364/200 |
| 4,555,810 | 11/1985 | Khoe et al. | 455/612 |
| 4,575,842 | 3/1986 | Katz et al. | 370/16 |
| 4,577,313 | 3/1986 | Sy | 370/88 |
| 4,597,078 | 6/1986 | Kempf | 370/94 |
| 4,597,082 | 6/1986 | Hill et al. | 371/32 |
| 4,621,362 | 11/1986 | Sy | 370/88 |
| 4,627,052 | 12/1986 | Hoare et al. | 370/88 |
| 4,644,468 | 2/1987 | Doster et al. | 364/200 |
| 4,679,193 | 7/1987 | Jensen et al. | 370/94 |
| 4,706,080 | 11/1987 | Sincoskie | 340/825.02 |
| 4,706,081 | 11/1987 | Hart et al. | 340/825.03 |
| 4,707,827 | 11/1987 | Bione et al. | 370/85 |
| 4,715,030 | 12/1987 | Koch et al. | 370/85 |
| 4,737,953 | 4/1988 | Koch et al. | 370/94 |
| 4,740,954 | 2/1988 | Cotton et al. | 370/60 |
| 4,771,286 | 9/1988 | Niessen et al. | 370/85 |

OTHER PUBLICATIONS

Schnaidt, Bridges and WANs, LAN Magazine, Sep., 1988, pp. 36-43.
L. Bosack et al., Problems in Large LANS, IEEE Network, Jan., 1988, pp. 49-56.
Hamner, et al., Source Routing Bridge Implementation, IEEE Network, Jan., 1988, pp. 33-36.
Salwen et al., Examination of the Applicability of Routing and Bridging Techniques, IEEE Network, Jan., 1988, pp. 77-86.

Primary Examiner—Douglas W. Olms
Assistant Examiner—Min Jung
Attorney, Agent, or Firm—Howson and Howson

[57] ABSTRACT

In a bridge for interconnecting local area networks, the decision on whether or not to forward a frame is based on the frame's destination address. This is made possible in a practical bridge by a hardware-based prefilter which causes an abbreviated representation of the destination address of each frame to be generated, and uses the representation to address a global address table or "GAT" memory. Each cell of the GAT memory may correspond to more than one destination address. If any destination address, corresponding to the cell addressed by the prefilter, is active on a remote local area network, the prefilter allows the frame to be forwarded for further filtering by a software-controlled processor. Otherwise, the frame is discarded.

17 Claims, 12 Drawing Sheets

LOCAL AREA NETWORK BRIDGE

BRIEF SUMMARY OF THE INVENTION

This invention relates to a local area network bridge or "LAN Bridge", and specifically to a LAN bridge having the capability of filtering message frames based on a look-up table of destination addresses.

A LAN Bridge is a device used to interconnect a LAN with one or more other LANs, through an interconnecting link or links, to form a larger network in which messages can be sent from a device on one LAN to one or more devices on another LAN as if all of the devices were on the same LAN. Usually, the LAN bridge is "transparent" to protocols above the MAC (medium access control) layer, which means that, so far as the users of any two communicating devices are concerned, it makes no difference whether the devices are on the same LAN or on different LANs.

Where two or more LANs are connected together, it is important to prevent message frames (or "packets") with local destinations from crossing the bridge. This is ordinarily accomplished by filtering carried out in the LAN bridge. Filtering is the process of weeding out and discarding frames which appear at the bridge, but which are merely traversing from one local device to another local device on the same side of the bridge. In a properly configured network, since most of the traffic remains local, filtering can greatly reduce the number of message frames which must be processed in the bridge. This allows a greater bandwidth to be allocated to the processing and forwarding of frames destined for remote devices, and reduces delays which would normally be expected as a result of an increased number of devices.

In general, filtering is carried out in a LAN bridge by comparing the destination address of each frame with a "list" of the addresses of the devices on the side of the bridge on which the frames originate. This process is clearly explained in U.S. Pat. No. 4,627,052 dated Dec. 2, 1986. If the destination address of a frame is not on the "list" of addresses in the LAN, it is presumed to be on a remote LAN, and the frame is forwarded by the bridge.

In a system involving only a pair of LANs connected by a single bridge, it would be relatively easy to carry out filtering by comparing destination addresses with a table of the addresses on the remote LAN. This would not be much more difficult, if at all, than comparing frame destination addresses with a table of local addresses. However, with multiple LANs, because of the large number of devices involved, it has not been considered feasible to carry out filtering on the basis of a table of remote destination addresses.

On the other hand, making the decision to forward or not to forward a message frame on the basis of remote addresses is desirable because, in a multiple LAN system, i.e. a system containing more than two LANs, the same information which is used to make the decision to forward or abort a frame can also be used to route the frame to the destination LAN. Another advantage to filtering on the basis of remote rather than local addresses is that doing so eliminates frames which are destined for non-existent addresses.

The general object of the invention is to provide a LAN bridge which efficiently conserves bandwidth in the interconnecting links by selectively forwarding frames so that only those intended for a remote LAN are forwarded.

A further object of the invention is to provide a LAN bridge in which the decision to forward or abort a message frame is based on a comparison of its destination address with all of the destination addresses detected as active in all of the remote networks to which the bridge is connected.

A still further object of the invention is to carry out the foregoing objectives at high speed and with high efficiency in order not to overburden the bridge microprocessor and not to slow down the forwarding of data.

It is also an object of the invention to carry out filtering based on a table of remote addresses by means of a hardware-based prefilter, and to provide a prefilter which operates with high reliability.

In accordance with the invention, each LAN has a bridge associated with it through which the LAN is connected to one or more wide area network links. Between any interconnected pair of LANs, therefore, there is a first bridge, an interconnecting link, and a second bridge.

Each such bridge comprises an assembly of conventional bridge elements including a communications processor, a master controller, a global memory and a net controller, all linked together through a system bus. The net controller includes processing means for receiving and analyzing address portions of frames transmitted from the LAN associated with the bridge, for passing selected frames to the interconnecting link. In this case the processor analyzes both destination addresses and source addresses.

The net controller is characterized by a memory means establishing a global address table (GAT) containing memory cells, each cell having a unique address representing at least one device address (i.e. a physical address of a device on the network, or a multicast address, or a broadcast address) in accordance with a predetermined formula, and each cell having two possible binary states, one representing that the device addresses to which it corresponds have been sensed outside the LAN, and the other representing that the device addresses to which it corresponds have not been sensed outside the LAN. The bridge includes means for generating a representation of the destination address of each frame transmitted in the LAN, using the same formula by which the cell addresses are generated, and means for receiving said representation and using it to address the global address table (GAT). Means responsive to the state of each addressed memory cell in the GAT are used to pass the frame's address information to the processing means if the addressed memory cell is in the first possible state, and to prevent the address information from reaching the processing means if the addressed memory cell is in the second possible state. This is accomplished by sending an artificial-collision signal to the local area network communications controller (LANCE), which is the device through which all user information passes to the processor and to the global memory of the bridge.

Thus, frames are prefiltered according to whether or not their destination addresses have been sensed outside the local network. As will be apparent from the following detailed description, prefiltering is carried out using a state machine comprising programmed array logic capable of carrying out the prefiltering operation with extremely high speed. Prefiltering greatly reduces the number of frames which need to be processed by software in the bridge, and allows a greater bandwidth to be allocated to the processing and forwarding of frames destined for remote devices.

Preferably, each cell address represents a number of frame destination addresses in accordance with a predetermined hash coding formula. Further, in the preferred embodiment of the invention, the memory means containing the global address table is a byte-wide RAM with individually addressable memory bytes, and the hash-coded representation of each destination address is in the form of a plurality of parallel bits, a first group of which are used to address the RAM, and a second group of which are connected to selecting means for receiving the RAM output and for producing therefrom a single bit of information corresponding to the addressed memory cell.

Final filtering carried out by software in the processor section of the net controller is based on tables of device addresses maintained in a local memory in the net controller. These tables contain the full addresses, each of which is typically 48 bits in length. The address length would make searching the tables by software a slow process, but for the fact that the hash-coded addresses, or portions thereof, are used as an index to locate the full addresses in the local memory of the net controller. In order to accommodate limitations on processor speed, a queue is set up in the "receive ring" of the local area network communications controller (LANCE) so that frame addresses are handled sequentially. The hash-coded address information is stored in the same order in a first-in, first-out (FIFO) register, which must always be in synchronization with the LANCE receive ring. To prevent a filled-up condition of the FIFO from causing an out-of-sync condition, each time the HPF begins to process a frame, if the FIFO register is filled beyond a predetermined limit less than its full condition, (e.g. half full), an abort signal is sent to the LANCE. The frame is thus thrown away, and the FIFO register and LANCE ring remain in synchronization with each other.

If an out-of-sync condition is detected by an inequality between the count in a packets forwarded counter and a count of receive interrupts maintained by the processor's software, the receive ring and the FIFO are both reset.

Further objects, details and advantages of the invention will be apparent from the following detailed description.

DETAILED DESCRIPTION

Figure 1:
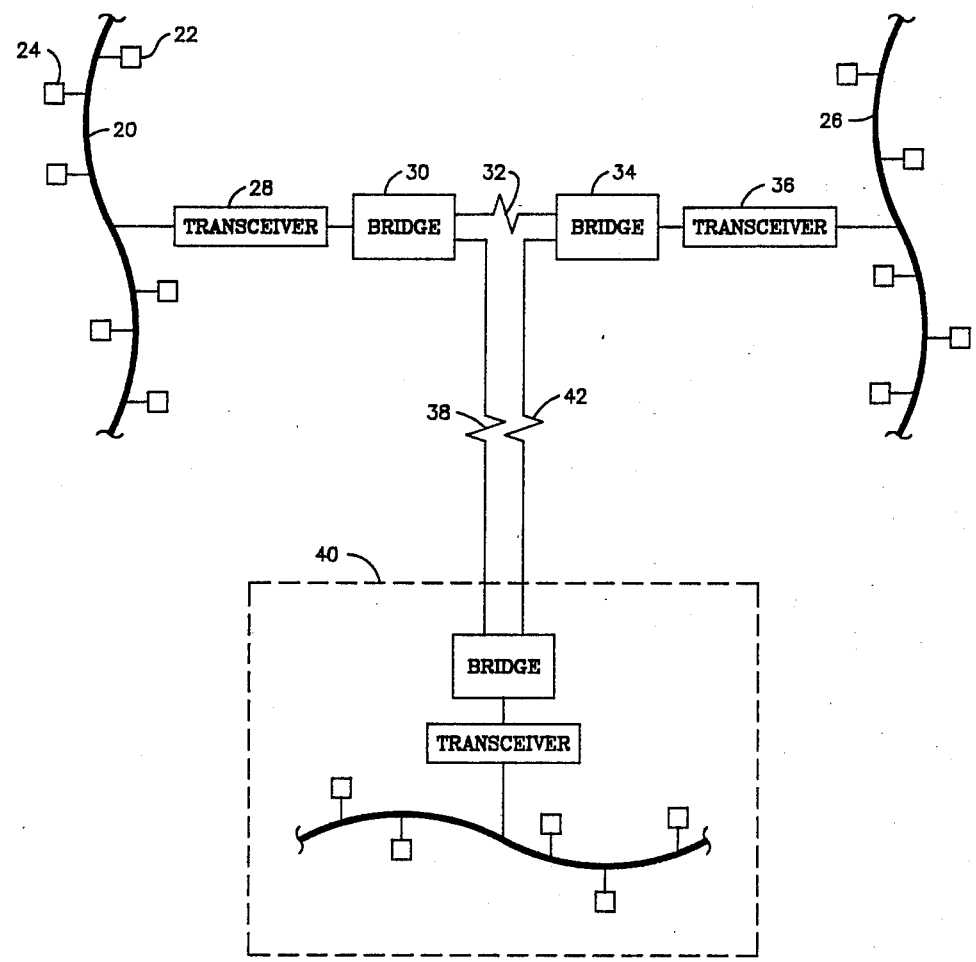
Fig. 1 is a schematic block diagram showing three local area networks interconnected by bridges in accordance with the invention.

FIG. 1 shows a first local area network (LAN) 20 having multiple devices or end stations including devices 22 and 24, connected to a second similar LAN 26 through a transceiver 28, a bridge 30, an interconnecting link 32, a second bridge 34, and a transceiver 36.

In the system according to the invention, each LAN has its own bridge associated with it. Thus, between any pair of directly interconnected LANs, there are two bridges.

An additional combination 40, comprising a LAN, a transceiver and a bridge, is interconnected with the first two LANs over interconnecting links 38 and 42 respectively. The interconnecting link can be any of a wide variety of communications links ranging from single wire or optical fiber links through more complex wide area network or "WAN" links. The WAN links can be any of a variety of types, including T1, RS449, and V.35. These WAN links typically operate at rates ranging from 9.6 to 2048 kilobits per second, depending on which type of WAN link is used.

Figure 2:
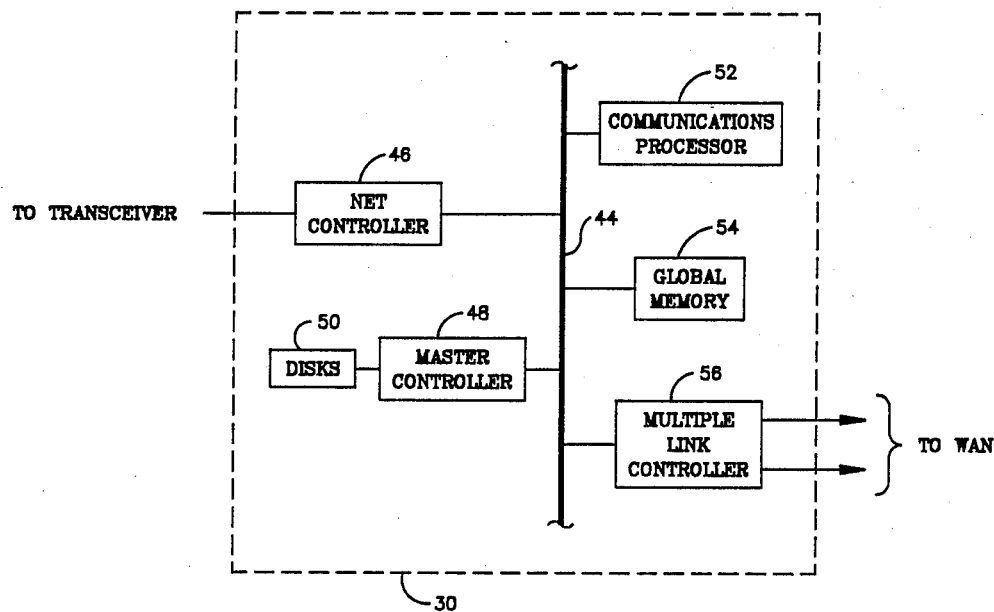
FIG. 2 is a schematic diagram showing the principle elements of the bridge.

FIG. 2, which is a block diagram of bridge 30, includes a system bus 44, through which are interconnected a net controller 46, a master controller 48 with its associated disks 50, a communications processor 52, a global memory 54 and a multiple link controller 56. The multiple link controller is used to deliver messages selectively to the appropriate interconnecting links.

Figure 3:
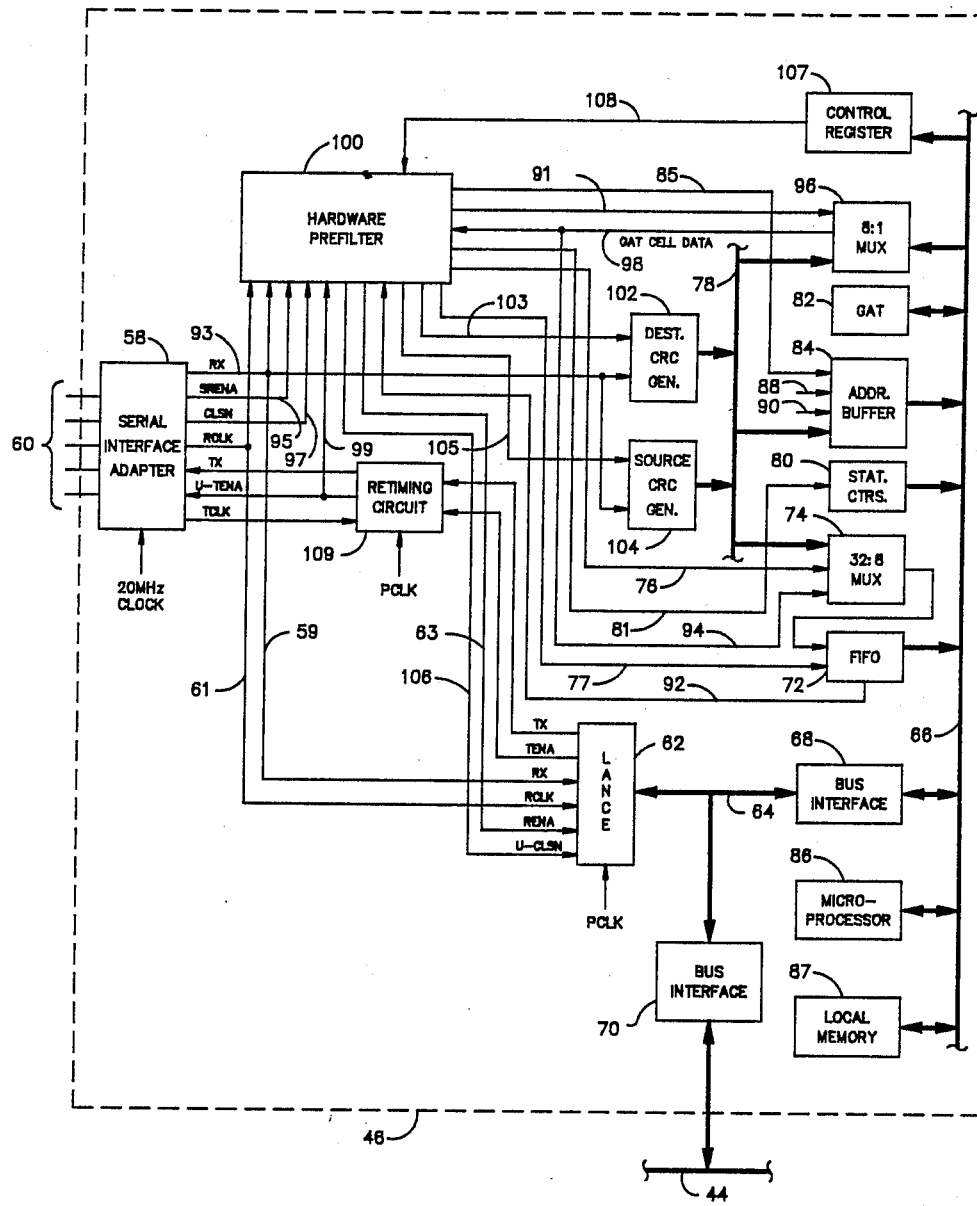
FIG. 3 is a schematic diagram showing the principle elements of the net controller section of the bridge.

The net controller, as shown in FIG. 3 comprises a serial interface adapter (SIA) 58, which is interconnected to a LAN transceiver (see Fig. 1) through an interface cable 60. In this example, the physical interface is "Ethernet" type, and the interface cable 60 is configured in accordance with IEEE standard 802.3. Data passing over cable 60 is in a Manchester-encoded differential signal format, and the cable carries transmit, receive and collision data as well as DC power.

SIA 58 produces three serial binary streams labeled RX (for receive data), CLSN (for collision) and RCLK (for receive clock). It has a 20 MHz clock. It also produces an output labeled SRENA (a raw receive enable signal), an output labeled TCLK (transmit clock), and receives inputs labeled TX (transmit data) and TENA (transmit enable).

The net controller comprises two local area network communications controllers or LANCEs, one being a user LANCE 62, and the other being a control LANCE (not shown because it is unrelated to the prefiltering operation discussed below). The control LANCE is used strictly for bridge control. All user data passes through the user LANCE 62 to the global memory 54 (FIG. 2).

LANCE 62 receives RX and RCLK from SIA 58 through paths 59 and 61 respectively. It also receives a receive enable (RENA) input through path 63 and a user LANCE collision input (U-CLSN) through path 106. The LANCE provides transmit data (TX) and user LANCE transmit enable (U-TENA) outputs.

The LANCE bus 64 is connected to a microprocessor bus 66 through a first bus interface 68. A microprocessor 86, resident on bus 68 as part of the net controller, uses software to separate out frames with faulty check bits or bad framing and also to carry out final filtering based on full destination and source addresses. A local memory 87 is provided on bus 66. A second bus interface 70, in turn, connects LANCE bus 66 to the system bus 44 (FIG. 2).

The elements connected to the microprocessor bus 66 include a first, in-first out register or FIFO 72, which receives destination and source address information as well as status information on frames which are passed by the prefilter. The FIFO receives address information (hash-coded using a "CRC" or cyclic redundancy check, formula) through multiplexer 74 from a "CRC" bus 78. Multiplexer 74 also receives frame status information, as well as control signals, from the prefilter through path 76. The FIFO receives control signals through path 77.

A group of statistics counters is provided at 80 and connected to microprocessor bus 66. These counters receive their inputs through path 81.

A global address table (GAT) 82 is part of a larger 8 bit wide RAM associated with the bridge microprocessor 86 through microprocessor bus 66. The GAT is addressed by means of an address buffer 84, which receives address information from the CRC bus 78, and additional bits of information through a 5 bit block select line 88 and a single bit bank select line 90. The block select line is used to select a portion of the RAM which is reserved for use as the global address table. That portion of the RAM is divided into two parts which are alternately selectable by the bank select line 90. This allows one bank to be updated while the other is in use.

The GAT is designed to behave essentially as a one bit wide addressable memory, each memory cell of which corresponds to an abbreviated device address, typically a 20 bit CRC of the full 48 bit device address. The state of the memory cell, either "1" or "0", indicates whether or not a device having an address CRC corresponding to the address of the memory cell is active on a remote network.

The GAT of each bridge in an interconnected system of LANs is set up by an exchange of information over supervisory channels between bridges. As a device becomes active on a particular LAN, the source address contained in a frame generated by the device is recognized by the bridge associated with that device and added to a table of local addresses in local memory. Before adding the address to local memory, the CRC of the address is extracted locally and used as an index to determine quickly whether or not the address is already present in local memory. A supervisory message is then sent to all other bridges in the system announcing the new address. Either the full address, or the locally generated CRC may be sent out to the other bridges. The CRC information, extracted from the full address in the remote bridges if necessary, is used to address a memory cell in the GAT of each remote bridge, and the state of each memory cell so addressed is set to "1". The foregoing operations may be carried out during a "learning phase" in which local device addresses are first placed in local memory and then information is exchanged by the interconnected bridges. After the learning phase, new addresses can be added to the GATs in a similar manner while the interconnected LANs are in operation.

Information can be cleaned out of the GATs from time to time by creating new GATs, or by updating the existing GATs using the inactive GAT banks.

Address buffer 84 receives an enabling signal through path 85.

CRC bus 78 is also connected to a multiplexer 96, which receives an instruction to read GAT data through path 91. Multiplexer 96 selects, from the byte of information in the GAT addressed through the address buffer 84, a single bit of information (a "0" or "1"). This single bit designated "GATD", for Global Address Table Data, is directed through line 98 to hardware prefilter (HPF) 100, and also through line 94 to FIFO 72. HPF 100 receives receive data RX from SIA 58 through line 93. It receives the raw receive enable SRENA through line 95. It receives collision (CLSN) as detected by the SIA through line 97.

Flags indicating when the FIFO register 72 is empty and when it is half full are delivered to HPF 100 through path 92. Control data (mode bits) are delivered to the HPF 100 from a control register 107 on bus 66 through line 108.

The RX output of the SIA in line 93 is directed to a destination address CRC generator 102, which generates a 20 bit cyclic redundancy check based on the destination address portion of each message frame appearing at the RX line. Similarly, a source address CRC generator 104 receives the message frame from the SIA's RX output, and generates a 20 bit cyclic redundancy check based on the source address. It is the destination CRC information which is used to address the global address table, and ultimately to determine whether a "0" or "1" will be delivered through GAT data line 98 to hardware prefilter 100. Control signals are delivered to generators 102 and 104 through paths 103 and 105.

For each 48-bit address, a CRC of 20 bits is produced. The hash coding formula used in the CRC generators produces a random distribution to insure a low statistical probability that two randomly chosen 48-bit address will produce the same CRC value.

Each time the hardware prefilter receives a "0" through GAT data line 98 for a given frame, it sends a collision signal CLSN through line 106 to LANCE 62. This prevents the frame from being passed through the LANCE for further analysis by software in microprocessor 86.

The LANCE 62 receives RX and RCLK directly from SIA 58 but receives RENA (receive enable) and CLSN (collision) from hardware prefilter 100.

The TX and TENA outputs of user LANCE 62 are delivered to a retiming circuit 109, which receives a processor clock input PCLK as well as the transmit clock output TCLK of the SIA. The retiming circuit delivers a transmit enable signal U-TENA, through path 99, to the SIA and to the HPF, and delivers transmit data TX to the SIA.

Figure 4:
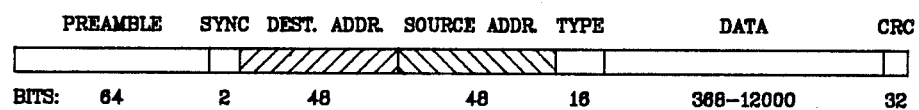
FIG. 4 is a diagram illustrating a typical message frame.

Before proceeding to a discussion of the operation of the hardware prefilter, brief reference should be made to FIG. 4, which depicts a typical message frame or packet in MAC (medium access control) format. The frame begins with a 64 bit preamble, consisting of alternating 1's and 0's used to synchronize the clock generator of SIA 58 to the incoming data in order to produce the RCLK and TCLK outputs.

Following the preamble are two synchronizing bits, both 1's. The synchronizing bits are recognized by the hardware prefilter as indicating that the destination address will immediately follow.

A destination address consists of 48 sequential bits, and is immediately followed by the source address, which also consists of 48 bits. Following the source address are 16 bits labelled "type", used in some cases to indicate the protocol of the frame, and in other cases to indicate its length. This is followed by a series of data bits, which range in number from 368 to 12,000 bits. Finally, a 32 bit cyclic redundancy check is included in order to provide a statistical verification of the preceding information. For the purpose of the following discussion, frame bits are numbered beginning with the first bit of the destination address and ending with the last check bit. The minimum number of bits in a frame therefore (excluding the preamble and sync bits) is 512, that is 48+48+16+368+32. The first 512 bits is considered to be the "slot time".

The preferred embodiment of the hardware prefilter is a state machine comprising a group of programmed array logic (PAL) elements, the programming details and interconnections of which are discussed in the latter part of this specification. However, its operation will most easily be understood by reference to FIG. 3, and to the state diagram of FIG. 5.

Figure 5:
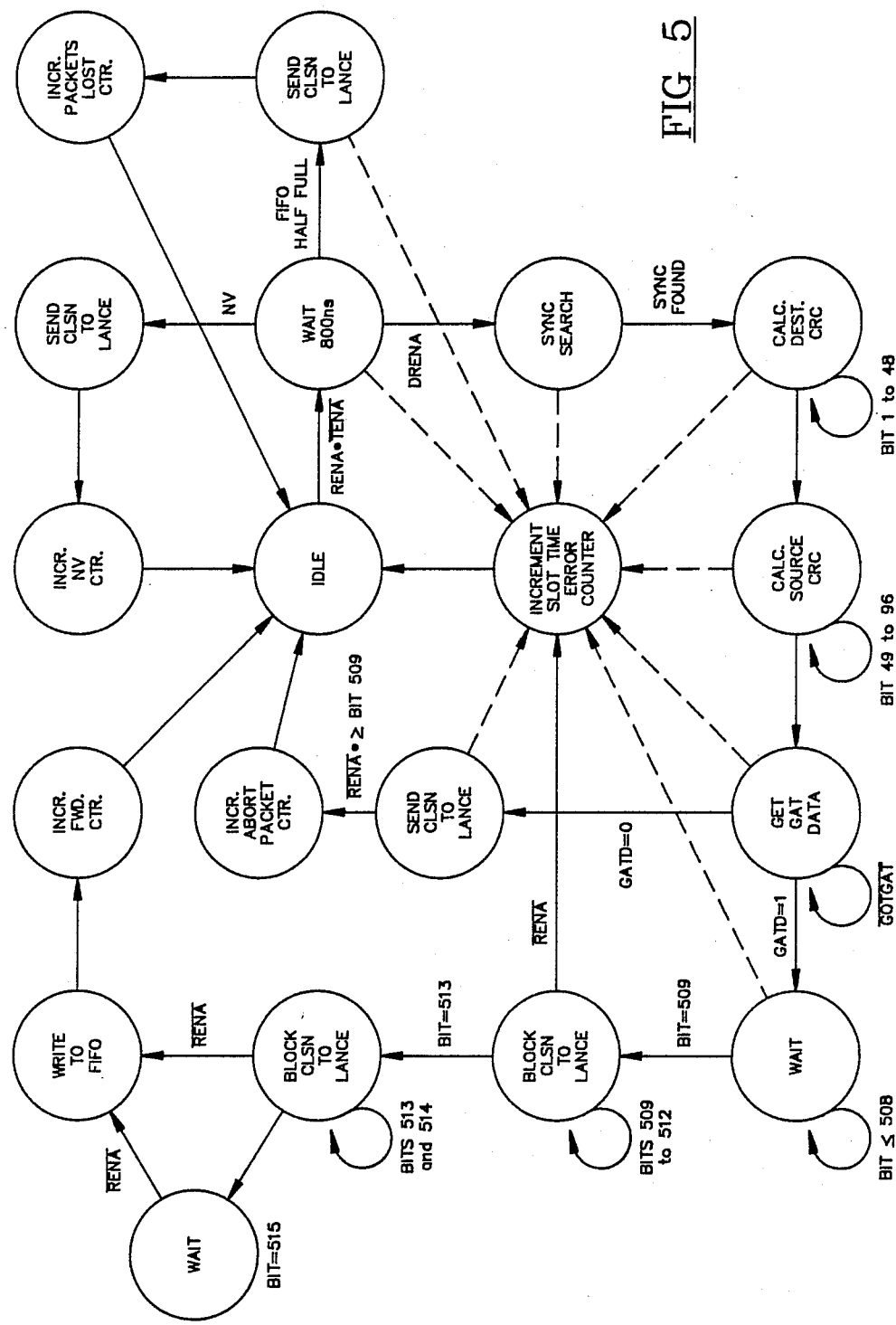
FIG. 5 is a state diagram illustrating the operation of the bridge, and particularly the operation of the hardware prefilter section of the net controller.

As indicated in FIG. 5, the HPF is normally in an idle condition, and remains idle until RENA is asserted and TENA is negated. This condition signifies carrier detection at the start of a receive frame. Immediately upon detection of this condition, the PACKETS RECEIVED section of statistics counters 80 is incremented. Then, the hardware prefilter waits for 800 nanoseconds to allow the phase locked loop of the serial interface adapter to become synchronized with the alternating 1's and 0's in the preamble so that the receive clock signal RCLK generated by SIA 58 will be, and remain, synchronized with the incoming data.

After this 800 nanosecond delay, a delayed receive enable signal DRENA is generated within the HPF, and the HPF looks for the two sync bits in the message frame. In the meantime, the CRC generators 102 and 104 are initialized by the HPF. Upon detection of the sync bits, the next 48 bits of the serial data stream, representing the destination address, are clocked into the destination CRC generator 102, and the destination address CRC is calculated. The next 48 bits, representing the source address, are clocked into the source CRC generator 104, which similarly calculates the source address CRC.

After the source address has been received, the HPF uses the destination address CRC from CRC generator 102 to address the global address table (GAT) 82. This is done through address buffer 84, and multiplexer 96. Seventeen bits of the 20 bit destination CRC select one 8 bit byte from 128 kilobytes of memory in one or the other of the two memory banks of the GAT, depending on which is selected through bank select line 88. The remaining three bits of the destination CRC cause the multiplexer 96 to select a single bit, whose state, either "0" or "1", is delivered by the hardware prefilter through line 98. By using this addressing scheme, the GAT, even though 128 kilobytes in length and 8 bits wide, is made to operate as if it were a one megabit, 1 bit wide memory.

In the state diagram, when the GAT data is retrieved, i.e. when GOTGAT occurs, one or the other of two possible paths is followed. If the global address table data bit GATD is "0", signifying that none of the device addresses corresponding to the destination CRC has been detected globally, the hardware prefilter sends a collision signal CLSN to LANCE 62, and aborts the LANCE, preventing the frame from being transferred to the global memory 54 through bus interface 70. When RENA is negated, due to the normal termination of the frame, the prefilter returns to its idle state, while causing the aborted packet counter (part of statistics counter 80) to be incremented. If, while waiting for the frame to terminate normally, there occurs a collision or a "runt" frame condition, the slot time error counter (also part of statistics counters 80) will be incremented instead of the aborted packet counter. The paths represented by broken lines in FIG. 5 are followed if a collision is detected or if receive enable is negated before the 509th bit.

The alternative path is followed when the global address table data bit GATD is "1", which signifies that an address corresponding to the destination CRC has been sensed outside the LAN. In this path, the HPF allows the received frame to pass on to software for further analysis. In normal operation, the prefilter waits for RENA to be negated, and at that time, frame status and address information is written into FIFO register 72. Specifically, the FIFO, which is an 8-bit wide register, receives, a frame status byte comprising a GAT data bit, a physical address indicator bit, a multicast address indicator bit, a broadcast address indicator bit, and a late collision indicator bit. It then receives 3 bytes containing the 20 bit destination address CRC followed by a filler byte (all "0"s), and finally 3 bytes containing the source address CRC.

The data input to the FIFO register 72 is derived, through multiplexer 74, from the CRC generators 102 and 104 and from the HPF. The multiplexer and FIFO are both controlled by signals from the HPF.

While the CRC address and status information is being registered in FIFO 72, the frame is forwarded by LANCE 62 to global memory 54. The LANCE then issues an interrupt to microprocessor 86 and notifies the microprocessor that a frame has been received. The microprocessor maintains an index of the location of the frame in global memory. Therefore, the LANCE also notifies the microprocessor of the location of the frame in global memory via a pointer.

When the microprocessor 86 is ready to perform software-controlled filtering, the FIFO data is read by the microprocessor along with the pointer, which points to the frame in global memory. The microprocessor then conducts further filtering to determine whether the frame should be forwarded or discarded. The further filtering includes an inspection of the frame for bad framing or faulty check bits. It also includes a comparison of the full 48 bit destination address with an address table maintained in local memory, and may also include a similar comparison of the source address of the frame with the table of addresses in local memory.

The abbreviated destination and source address information (in CRC form) in the FIFO is used to locate, by way of an index established in the local memory by software during the learning process, the corresponding full device addresses and associated information, as stored in local memory. Either the full 20 bit CRC address information, or parts thereof (e.g. 10 bits) may be used to index the local memory. Indexing of the local memory in this manner speeds up location of the full addresses, making it possible for software to carry out filtering based on the full 48-bit addresses.

Final filtering, therefore, is carried out on the basis of the full destination address, but only on frames passed by the prefilter. Efficient final filtering is achieved by virtue of the elimination of a large percentage of frames in the prefiltering process, and by virtue of the indexing of the address tables in local memory according to CRC information derived from the full addresses.

When the results of the hardware prefilter operation are sent to the FIFO register, the packets forwarded section of the statistics counters is incremented, and the hardware prefilter goes to its idle condition to await the next frame.

If a collision occurs within the first 508 bit times during the reception of a frame, a collision signal CLSN is generated by SIA 58, the HPF 100 will send a corresponding collision signal U-CLSN to LANCE 62. The LANCE will then discard the frame and no data corresponding to the packet is written into the FIFO. The path followed is one of the broken lines in FIG. 5. The collision signal is delivered immediately to the LANCE, and when Receive enable (RENA) is negated, the slot time error counter is incremented, and the HPF goes to its idle condition.

If, however, a collision is detected during the 509th through 514th bits, the HPF generates a blocking signal preventing the collision signal CLSN from going to the LANCE until the 515th bit. The purpose of blocking the collision signal is to insure that both the LANCE and the HPF are in agreement in recognizing any collision after the 508th bit as a "late collision". If this synchronization of the HPF and LANCE did not occur, the number of frames recognized and received by the LANCE and the HPF could be different. This would result in a mismatch of information between the LANCE's receive queue and the FIFO, yielding incorrect address information on searching for the actual address using the CRCs from the FIFO.

If a late collision occurs, or if there is no collision, the HPF waits until RENA is negated. At that time packet status and address information is written to FIFO register 72, a packets forwarded counter (part of status counters 80) is incremented, and the HPF returns to idle. If a late collision had occurred, the late collision status bit will have been set to "1".

If Receive Enable (RENA) is negated during the slot time (the first 512 bits), the slot time error counter is incremented and the HPF returns to idle. Thus in the state diagram (FIG. 5), the same path is followed as for a collision (CLSN) during the first 508 bit times.

The count in the packets forwarded counter (part of status counters 80) must always be equal to the count of receive interrupts maintained by software. If an inequality is detected, indicating that the HPF and the LANCE are out of sync, all receive packets from the error on must be flushed and the HPF and LANCE ring must be reset. This is accomplished in part by resetting and setting the RESET & DISABLE HPF code (HPFMOD0=HPFMOD1=0) in control register 107. The LANCE ring is purged during the reset state of this bit. The LANCE ring is the queue or list of pointers created by the LANCE, indicating the location of all received frames that have yet to be processed by the microprocessor. Since all pending FIFO information has been purged, all pending frames must also be discarded.

Again referring to FIG. 5, there is one situation which may occur frequently on a busy net which would cause an error condition. If the FIFO register fills up, it will lose information and the HPF and LANCE will get out of sync with each other. The FIFO register 72 is typically 512 bytes deep. It holds 8 bytes of information for each frame. This means that the FIFO register is capable of holding a maximum of 64 frames. The FIFO register has a half-full flag which is used to automatically govern the maximum amount of buffered data and to limit it to 32 frames of information. The LANCE's receive ring should also be set to the same size or greater. When the HPF starts processing a receive frame, it checks the status of the half-full flag. If the flag is set, the user LANCE 62 is aborted by a collision as indicated in FIG. 5, and the packets lost counter (part of statistics counters 80) is incremented. In this way, the HPF throws away all packets in excess of what the software can process.

While only destination address information is used for prefiltering, the source address CRC is stored in the FIFO register along with destination address CRC, and is used to locate the full source address in the local memory. The source address information may be used, for example to prevent unauthorized source devices from transmitting certain types of frames to remote LANS.

FIGS. 6-9 show how data frame information is stored and located in global memory, how abbreviated source and destination address information is stored in the FIFO register, and how full addresses, and other information used in filtering by the microprocessor, are stored in local memory.

Figure 6:
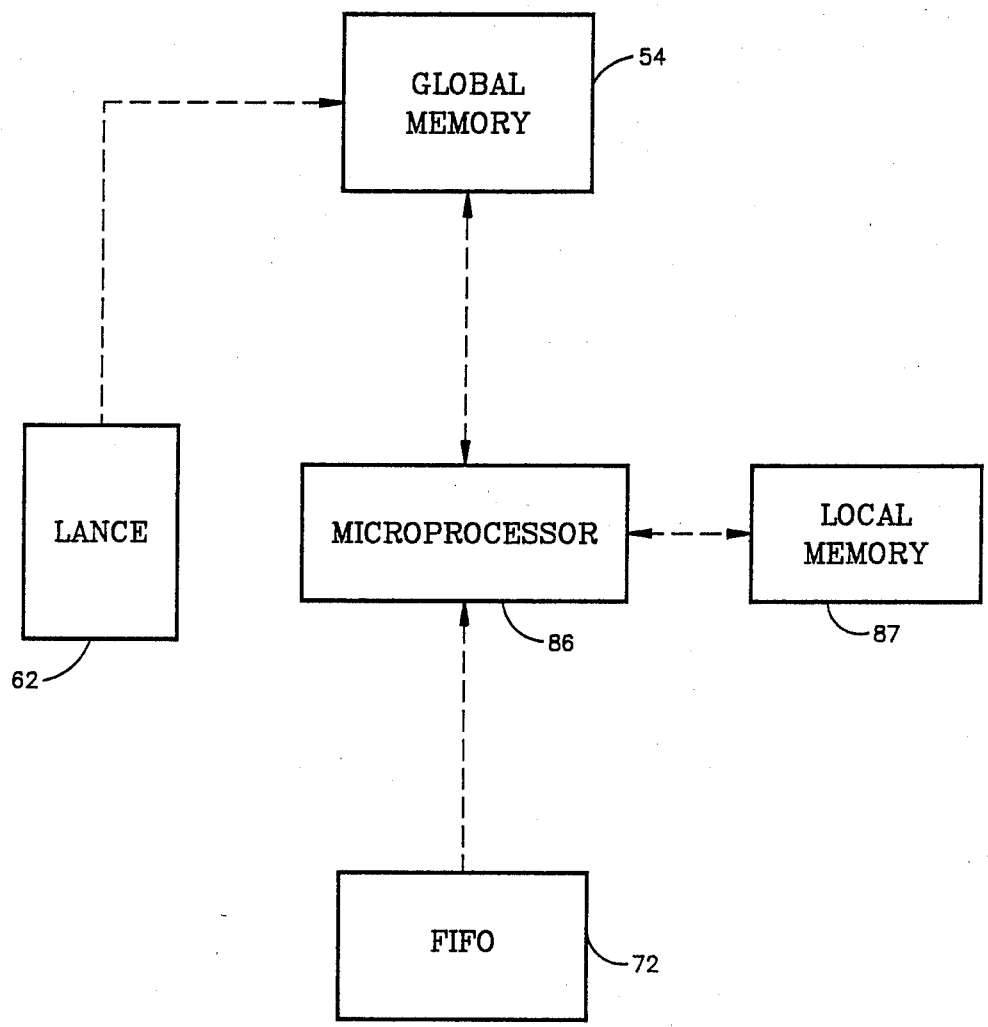
FIG. 6 is a block diagram illustrating the flow of pointer and control information between elements of the bridge.

FIG. 6 shows the paths for the flow of pointer and control information between the LANCE, global memory, local memory, the FIFO and the microprocessor.

Figure 7:
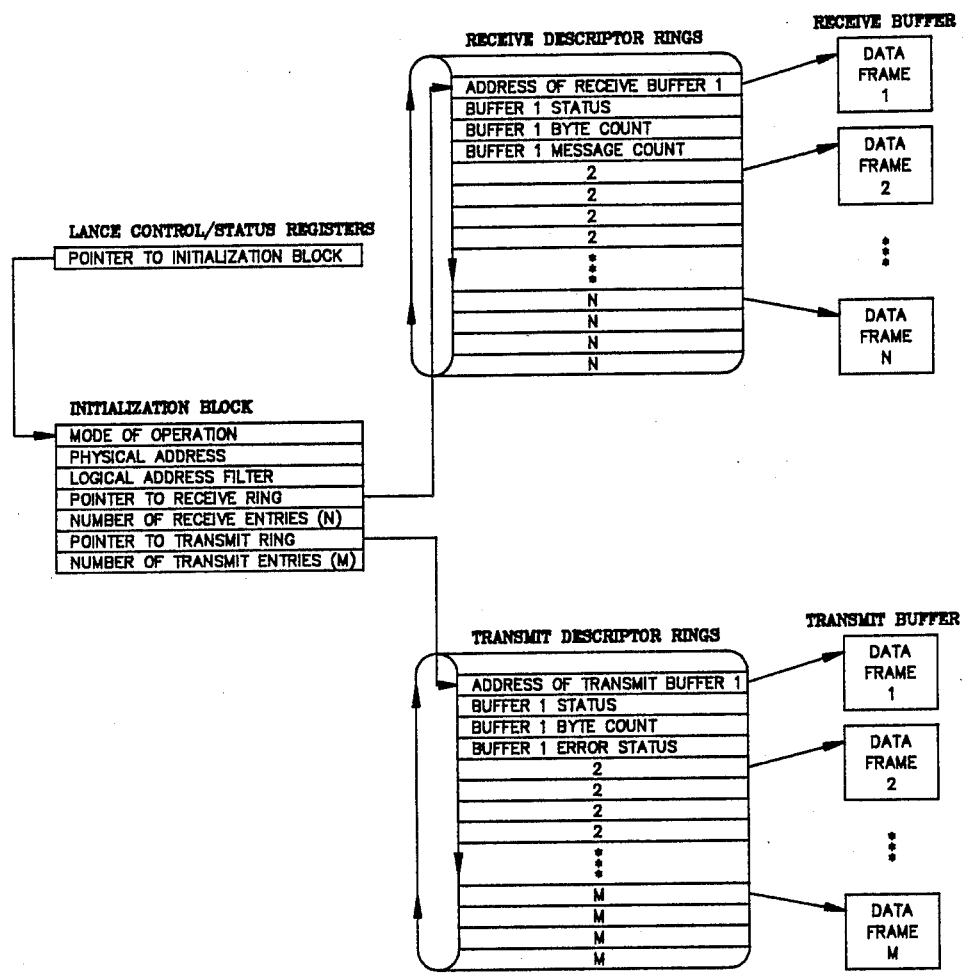
FIG. 7 is a schematic diagram illustrating the manner in which message frames are stored in the global memory of the bridge.

As shown in FIG. 7, receive and transmit data frames are stored respectively in a receive buffer and a transmit buffer in the global memory Receive and transmit descriptor rings are also established in the global memory in order to store address information permitting sequential retrieval of data frames from the buffer memory, as well as other information concerning the stored data frames. It should be recognized, of course, that the data structure need not necessarily take the form of a "receive ring". Other data structures can be used, and data can be stored in the global memory in random order if desired.

Figure 8:
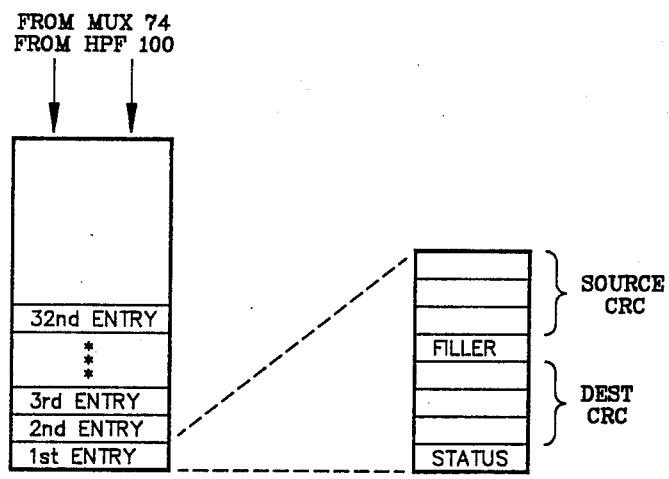
FIG. 8 is a schematic diagram illustrating the organization of a first-in, first-out register used in the net controller section of the bridge.

As shown in FIG. 8, the FIFO register (FIFO 72 in FIG. 3) maintains a stack of entries, which may number as many as 32, if the FIFO is half full. Each entry includes three bytes containing the source CRC, a filler byte, three bytes containing the destination CRC, and a status byte.

Figure 9:
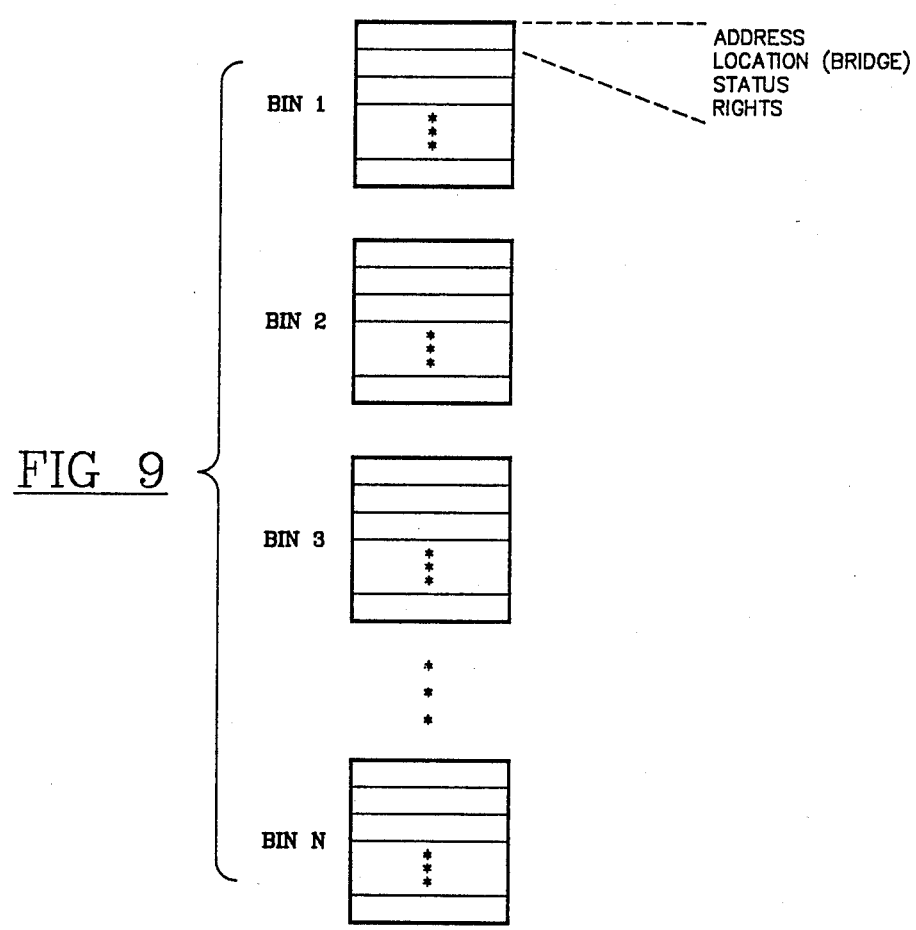
FIG. 9 is a schematic diagram illustrating the organization of the local memory in the net controller section of the bridge.

As shown in FIG. 9, the local memory is divided into a series of bins. Each bin contains multiple entries, including the full address of a device, and identification of the bridge of the LAN on which the device is located, and status information as well as information concerning rights associated with the particular device. There should be one entry in the local memory for each active device in the system, including local devices, i.e. devices on the LAN with which the memory is directly associated.

The location information in local memory (FIG. 3) is used by the multiple link controller (FIG. 2) to determine which of several interconnecting links is used to transmit the frame. The location information can be derived by software in the process of storing addresses in local memory.

As information on rights associated with each device in the interconnected LANs is stored in the local memory of the bridge's net controller, it is possible to carry out software filtering in the bridge, on the basis of the source addresses in frames generated by local devices. For example, if a device having a particular address attempts to transmit a broadcast frame, and is not authorized to do so, the rights information in local memory of the bridge associated with that device will cause the frame to be discarded when software recognizes, from the rights information associated with the address of that device, that the device is not authorized to broadcast.

In storing addresses and associated information as entries in local memory, the processor calculates the CRC of the address, and uses either the full CRC, or a portion thereof, to select the bin in which the entry is placed. Thus, so long as the FIFO of FIG. 8 and the receive ring of FIG. 7 are kept synchronized with each other, the source and destination CRC information from the FIFO (or parts thereof) can be used to locate the appropriate bins in local memory in which device information is stored. After the bin for a particular address is located, the microprocessor carries out a further search within the bin until an address is located which corresponds to the source or destination address derived from the receive buffer. The speed of location of device information in the local memory is greatly enhanced by dividing the local memory into bins, and further enhanced by the use of the FIFO, as the FIFO eliminate the necessity for recalculation of the CRCs.

The hardware prefilter HPF 100 of FIG. 3 is made up of a group of programmed logic arrays (PALs) depicted in FIGS. 10-19. Signal inputs and outputs of the PALs are labelled, and similarly labelled lines are connected. Signal inputs of each PAL are on the left, and outputs are on the right. Labels followed by the suffix "-L" indicate that the signal designated by the label is in the logical "Low" condition when asserted. The PAL inputs and outputs which correspond to paths shown in FIG. 3 are correspondingly numbered. Unless otherwise indicated, the unnumbered inputs of the PALs are connected to correspondingly labelled outputs of other PALs. Some of the PAL outputs are connected both to other PALs and to other elements of the net controller.

PAL 9

Figure 10:
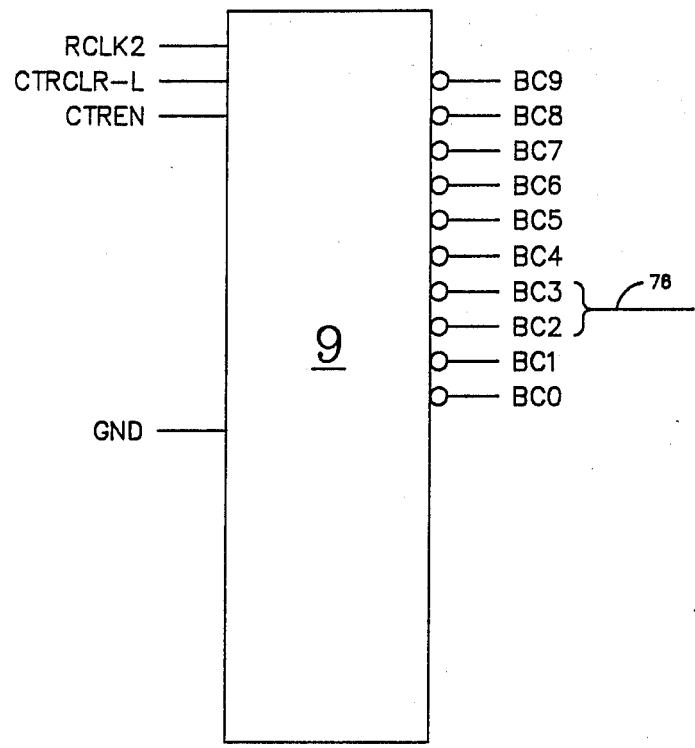
FIGS. 10-19 are schematic diagrams of the programmed array logic elements which make up the hardware prefilter.
Figure 11:
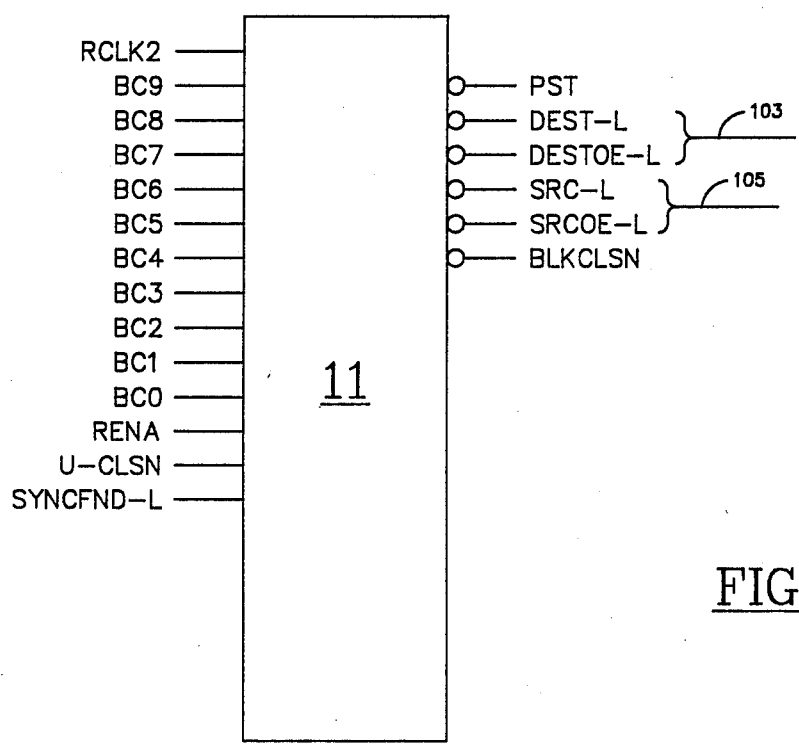

FIG. 10 shows a PAL (programmed array logic) counter 9 which receives a clock input RCLK2, which corresponds to the RCLK output of SIA 58 (FIG. 3) but is derived through a driver (not shown) from the RCLK output. pALs 11, 12, 13, 14, 15, 16, 17 and 18 also receive RCLK2. The counter is grounded at GND and receives a counter clearing input CTRCLR-L and a counter enable input CTREN, both from PAL 16.

The outputs BC0-BC9 are binary coded so that the outputs are initially low, the first clock pulse shifts BC0 to a high condition, the second clock pulse shifts BC0 low and shifts BC1 high, and so on. These binary-coded outputs BC0-BC9 are connected to PALs 11 and 12.

PAL 11

PAL 11 (FIG. 11) receives receive enable signal RENA from PAL 15, a synchronization bit found signal SYNCFND-L from PAL 15 and a user LANCE collision signal U-CLSN from PAL 18. Its primary function is to produce time and enable signals corresponding to the destination and source addresses for operating the CRC generators 102 and 104 (FIG. 3). It also generates a signal BLKCLSN which blocks collision to the LANCE during bits 509 through 513. It also produces a post slot time signal PST at the 511th bit.

The destination address time signal DEST-L produced by PAL 11 is asserted during bit times 0 to 47. SYNCFND-L and RENA must be asserted for DEST-L.

The destination output enable signal DESTOE-L acts as an enable output for the destination CRC generator 102 during the destination address time if RENA is asserted. It is also asserted after the 96th bit until the 512th bit when RENA is asserted. During the time when RENA is off at the end of a packet, DESTOE-L acts as an enable output during bit times -5, which correspond to destination address CRC bits.

The source address time signal SRC-L is asserted during bit times 48 through 95 if SYNCFND-L and RENA are asserted.

The source output enable signal SRCOE-L acts as an enable output for the source CRC generator 104 during the source address time if RENA is asserted. During the time when RENA is off at the end of a packet, SRCOE-L also acts as an enable output during bit times 16-31 which correspond to source address CRC bits.

The block collision signal BLKCLSN is asserted during counts 509 through 513 if the user LANCE collision signal U-CLSN from PAL 18 is low. This output blocks collision to the LANCE during bit times 509 through 513, in the event of a late collision, in order to insure slot time synchronization between the LANCE and the HPF.

The post slot time signal PST goes high at the 511th bit, and remains latched in a high condition so long as SYNCFND-L is asserted, i.e. until the end of the frame.

The operation of each PAL can be represented by a set of logic equations where:

! is a logical NOT,
# is a logical OR, and
& is a logical AND.

The colon ":" indicates that the output is clocked, i.e. it is delivered through a flip-flop and change state only when a clock pulse occurs.

The logic equations for the outputs of PAL 1I are as follows:

```
DEST-L =     !(!BC4 & !BC5 & !BC6 & !BC7 & !BC8 & !BC9 &
             RENA & !SYNCFND-L
             # !BC5 & !BC6 & !BC7 & !BC8 & !BC9 & RENA
             & !SYNCFND-L);
DESTOE-L =   !(!BC4 & !BC5 & !BC6 & !BC7 & !BC8 & !BC9
             & !RENA
             # BC8 & !BC9 & RENA
             # BC7 & !BC8 & !BC9 & RENA
             # BC5 & BC6 & !BC7 & !BC8 & !BC9 & RENA
             # !BC4 & BC5 & !BC6 & !BC7 & !BC8 & !BC9 &
             RENA
             # !BC5 & !BC6 & !BC7 & !BC8 & !BC9 &
             RENA):
SRC-L =      !(!BC5 & BC6 & !BC7 & !BC8 & !BC9 & RENA
             & !SYNCFND-L
             # BC4 & BC5 & !BC6 & !BC7 & !BC8 & !BC9 &
             RENA & !SYNCFND-L);
SRCOE-L =    !(BC4 & !BC5 & !BC6 & !BC7 & !BC8 & !BC9 &
             !RENA
             # !BC5 & BC6 & !BC7 & !BC8 & !BC9 & RENA
             # BC4 & BC5 & !BC6 & !BC7 & !BC8 & !BC9 &
             RENA):
BLKCLSN: =   (!BC0 & !BC1 & !BC2 & !BC3 & !BC4 & !BC5
```

-continued

```
            & !BC6 & !BC7 & !BC8 & BC9 & RENA &
            !SYNCFND-L & !U-CLSN
            # BC2 & BC3 & BC4 & BC5 & BC6 & BC7 &
            BC8 & !BC9 & RENA & !SYNCFND-L & !U-
            CLSN);
PST: =      (PST & !SYNCFND-L
            # BC0 & BC1 & BC2 & BC3 & BC4 & BC5 &
            BC6 & BC7 & BC8 & RENA & !SYNCFND-L).
```

PAL 12

Figure 12:
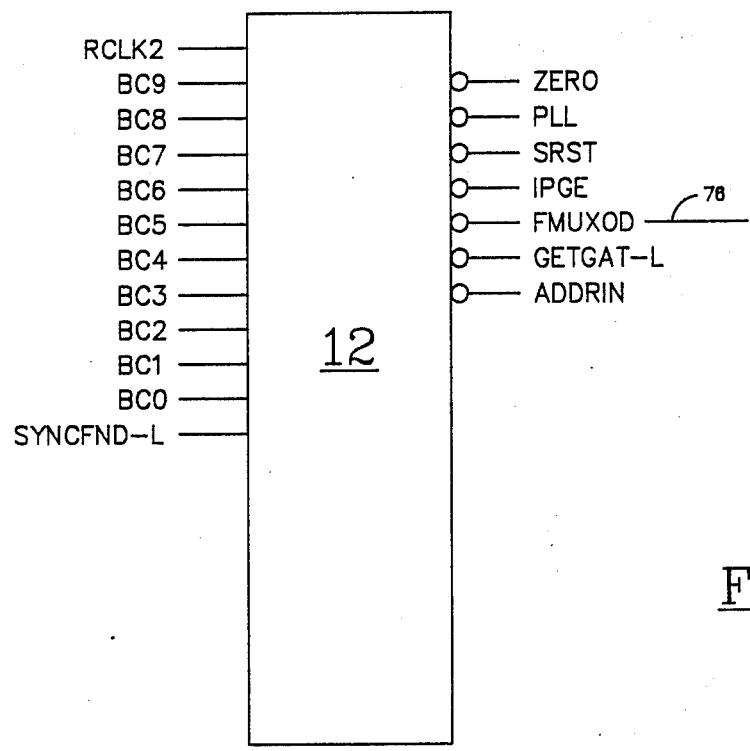

PAL 12, shown in FIG. 12, is also controlled by RCLK2, the outputs of counter PAL 9, and SYNCFND-L (from PAL 15).

The ZERO output is high when all of the counter bits BC0-BC9 are low.

PLL goes high at the count of 7, i.e. when BC0, BC1 and BC2 are high, while the other counter bits are low. It remains high for one clock cycle, and signifies that the phase-locked loop is locked.

SRST, a "Start Reset" output gives high when the count is 32. SRST is used to assert a reset HPF signal at count 32 during End of Packet (EOP-L) time of 6.4 microseconds.

An Interpacket Gap End output IPGE goes high when the count is 61. IPGE is used to control testing of the width of the interpacket gap for back-to-back reception of packets. This gap is typically 9.6 microseconds. The test must see a minimum of 6.4 microseconds for an interpacket gap. IPGE is used in determining where the End of Packet processing time terminates, by way of the CTRCLR-L output of PAL 16, the BC outputs of PAL 9 and the ZERO output of PAL 12. The ZERO output is used in PAL 16 to generate EOP-L and in PAL 13 to generate RSTHPF-L.

The FIFO MUX Output Disable output FMUXOD is high from count 16 through count 19. It is used to generate the filler byte in the FIFO.

The GETGAT-L output, for "GET Global Address Table", is asserted, i.e. low, when the count is 120 after SYNCFND is asserted. Once asserted, GETGAT-L remains asserted as long as SYNCFND-L is asserted. It triggers the reading of the global address table 82 for the current destination address CRC.

The ADDRIN output, for "ADDress IN", goes high at a count of 95 after SYNCFND-L is asserted, and remains high as long as SYNCFND-L is asserted. This indicates that the source and destination addresses have both been received by the CRC generators.

The equations for the outputs of PAL 12 are as follows:

```
ZERO =      (!BC0 & !BC1 & !BC2 & !BC3 & !BC4 & !BC5 &
            !BC6 & !BC7 & !BC8 & !BC9);
PLL =       (BC0 & BC1 & BC2 & !BC3 & !BC4 & !BC5 &
            !BC6 & !BC7 & !BC8 & !BC9);
SRST =      (BC0 & !BC1 & !BC2 & !BC3 & !BC4 & BC5 &
            !BC6 & !BC7 & !BC8 & !BC9);
IPGE: =     (BC0 & BC1 & !BC2 & !BC3 & BC4 & !BC5 &
            BC6 & !BC7 & !BC8 & !BC9);
FMUXOD: =   (!BC2 & !BC3 & BC4);
GETGAT-L: = !(!GETGAT-L & !SYNCFND-L
            # !BC0 & !BC1 & !BC2 & BC3 & BC4 & BC5 &
            BC6 & !SYNCFND-L);
ADDRIN: =   (ADDRIN & !SYNCFND-L
            # BC0 & BC1 & BC2 & BC3 & BC4 & !BC5 &
            BC6 & !SYNCFND-L).
```

PAL 13

Figure 13:
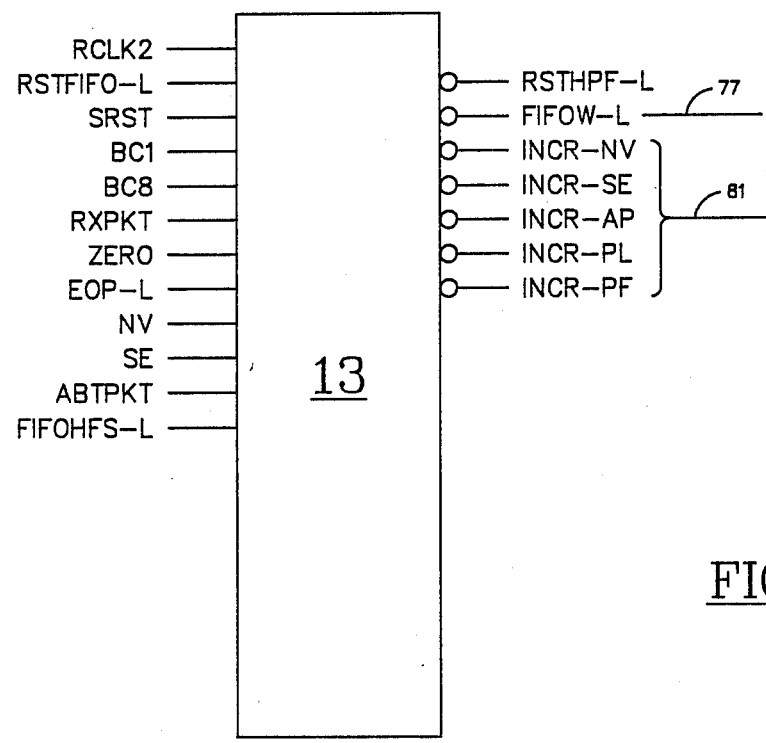
Figure 14:
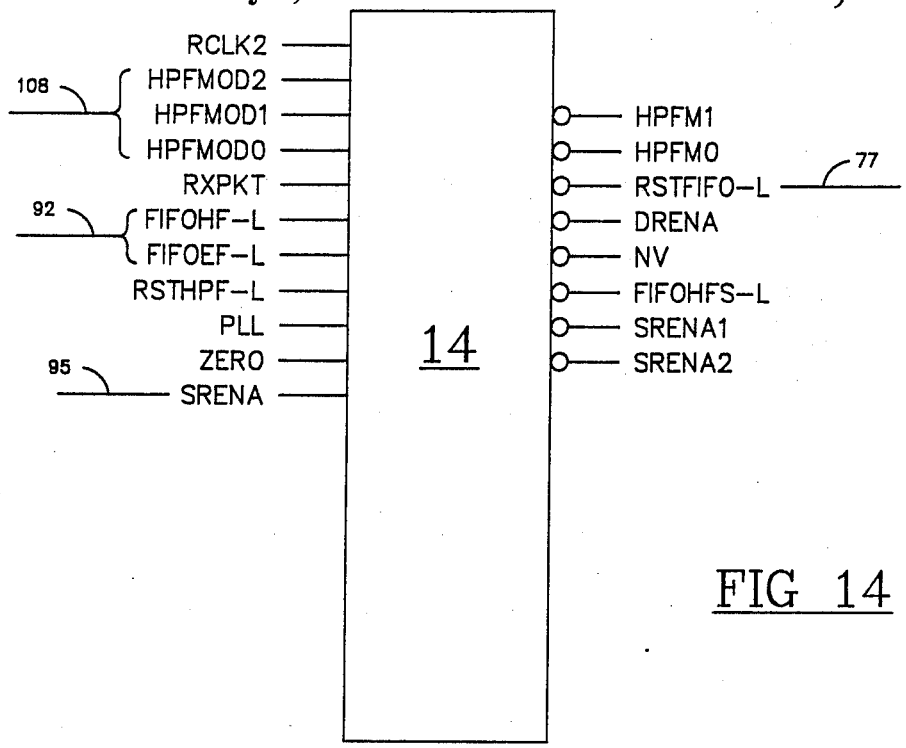
Figure 15:
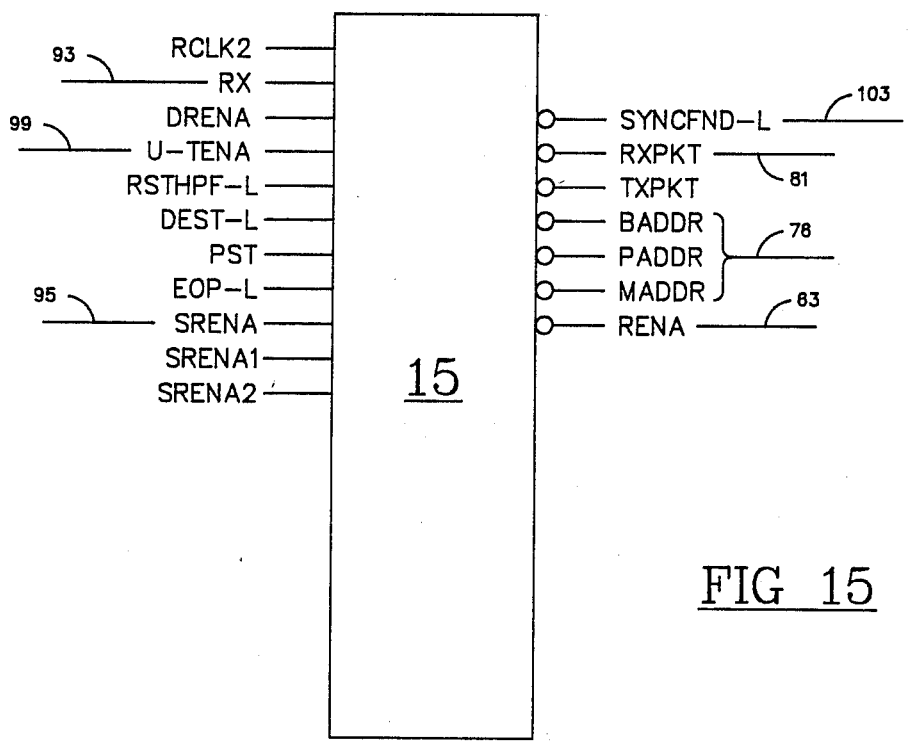
Figure 16:
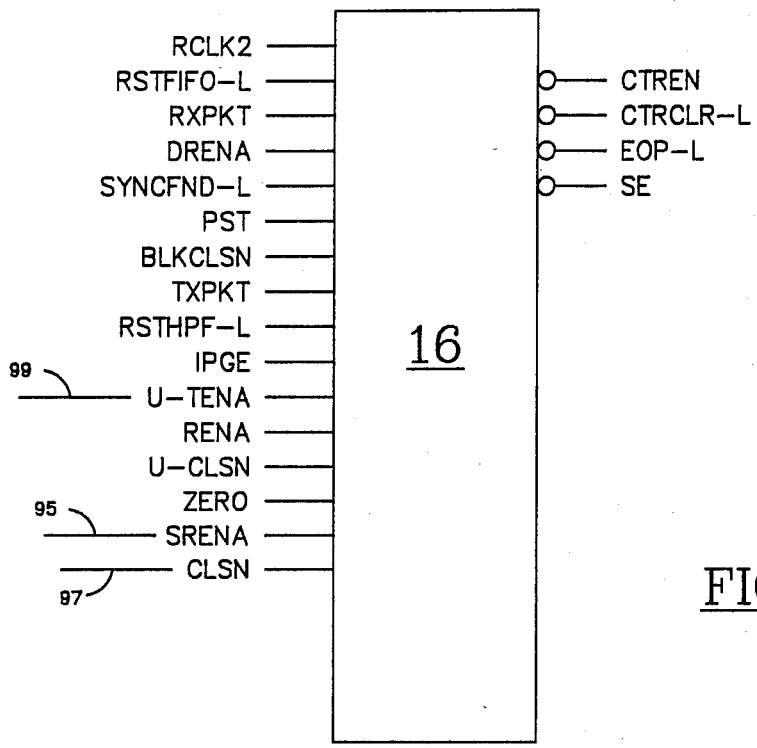
Figure 17:
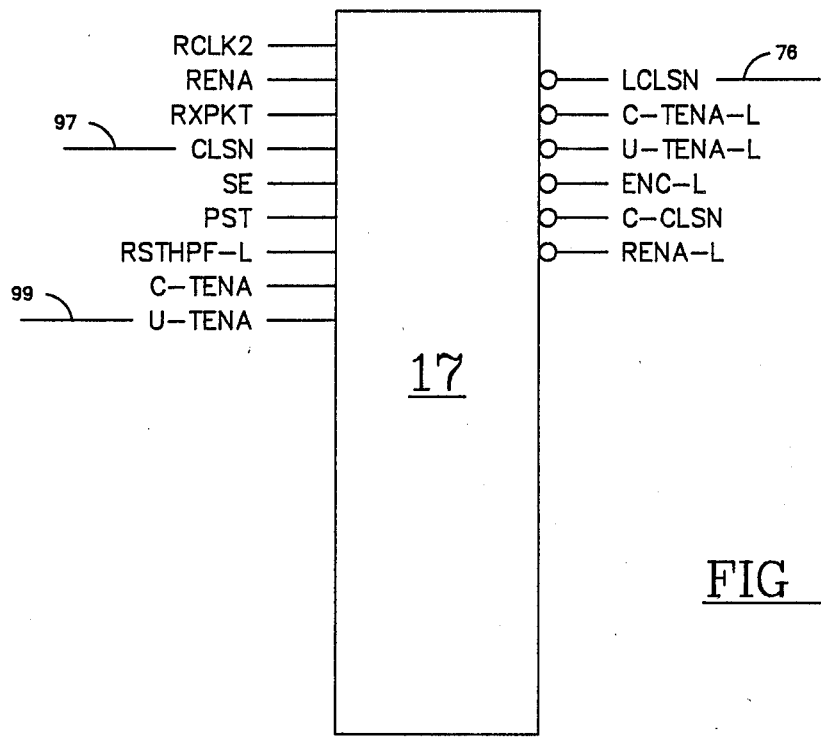
Figure 18:
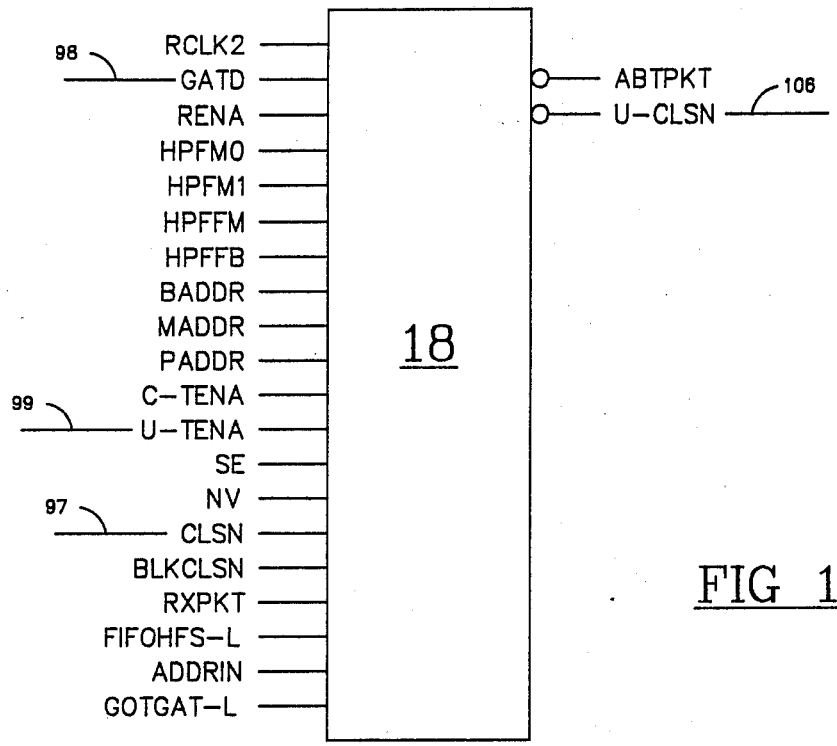
Figure 19:
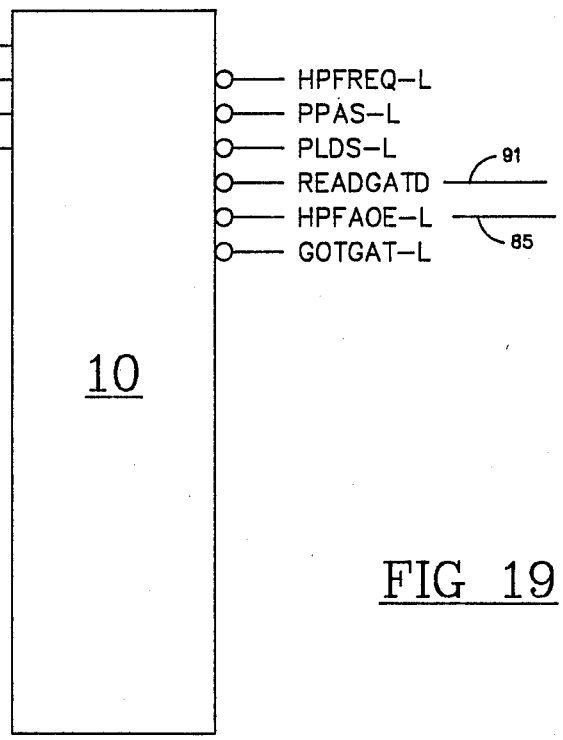

PAL 13, shown in FIG. 13, generates signals which increment various statistical counters (network violation, packet forwarded, packet lost, etc.) which are contained within statistics counters 80 in FIG. 3. PAL 13 also generates a RESET Hardware PreFilter signal RSTHPF-L and a FIFO Write Signal (FIFOW-L).

The RSTHPF-L output is asserted first when a ReSeT FIFO (RSTFIFO-L from PAL 14) signal is asserted, or during the EOP-L (End Of Packet from PAL 16) time if the SRST (Start ReSeT from PAL 12) is asserted. Once asserted, this signal is latched and remains latched until the counter is zeroed.

The FIFOW-L output, for FIFO Write, is asserted only when the packet is successfully forwarded, the hardware prefilter is not in reset state, end of packet time is reached (EOP-L true) and finally counter bits BC0 and BC1 are 1 and 0 respectively. This signal is the strobe for writing to the FIFO register.

The INCR-NV output, for INCRement Network Violation counter, has the highest priority among all the other incrementing signals, namely Slot Error, Abort Packet, Packet Lost and Packet Forwarded. When a network violation occurs, that is a violation of the interpacket gap of 6.4 microseconds between back-to-back packets, the INCR-NV signal is generated during the EOP-L low time, if Receive Packet (RXPKT) is true and the hardware prefilter is not in the reset state. Once asserted, it stays latched until RSTHPF-L is asserted.

The INCR-SE output, for INCRement Slot Error counter, has the next highest priority. It is asserted when a slot error occurs in the absence of a network violation. A slot error occurs in the case of a short packet or in the case of a packet terminated by a collision during the slot time, i.e. the first 508 bits following SYNCFND-L. All the other condition described for INCR-NV hold true for this signal. Once asserted, INCR-SE stays latched until RSTHPF-L is asserted.

The INCR-AP output, for INCRement Abort Packet counter, has the next highest priority. It is asserted when no slot error and no network violation have occurred, but the packet was still aborted because the blocking mode was set or the packet did not pass the prefilter. All the other condition described for INCR-NV hold true for this signal. Once asserted, INCR-AP stays latched until RSTHPF-L is asserted.

The INCR-PL output, for INCRement Packet Lost counter, has the next highest priority. It is asserted when NV, AP and SE have not occurred but the FIFO is half full, meaning that the prefilter cannot handle any more packets. All the other condition described for INCR-NV hold true for this signal. Once asserted, INCR-PL stays latched until RSTHPF-L is asserted.

The INCR-PF output, for INCRement Packet Forwarded counter, has the lowest priority of all of the statistical counters. It is asserted when none of the NV, AP, SE and PL has not occurred and the current packet is to be forwarded to software for further processing. All the other condition described for INCR-NV hold true. Once asserted, INCR-PF stays latched until RSTHPF-L is asserted.

The equations for the outputs of PAL 13 are as follows:

```
RSTHPF-L: = !(!RSTHPF-L & !ZERO # !EOP-L & SRST #
            !RSTFIFO-L);
```

-continued

| | |
|---|---|
| FIFOW-L: = | !(BC0 & !BC1 & !EOP-L & INCR-PF & RSTHPF-L); |
| INCR-NV: = | (INCR-NV & RSTHPF-L # !EOP-L & NV & RSTHPF-L & RXPKT & ZERO); |
| INCR-SE: = | (INCR-SE & RSTHPF-L # !EOP-L & !NV & RSTHPF-L & RXPKT & SE & ZERO); |
| INCR-AP: = | (INCR-AP & RSTHPF-L # ABTPKT & !EOP-L & !NV & RSTHPF-L & RXPKT & !SE & ZERO); |
| INCR-PL: = | (INCR-PL & RSTHPF-L # !ABTPKT & !EOP-L & !FIFOHFS-L & !NV & RSTHPF-L & RXPKT & !SE & ZERO); |
| INCR-PF: = | (INCR-PF & RSTHPF-L # !ABTPKT & !EOP-L & FIFOHFS-L & !NV & RSTHPF-L & RXPKT & !SE & ZERO). |

PAL 14

PAL 14 (FIG. 14) generates the signals which control the various modes of the hardware prefilter via HPFM0 and HPFM1 (HPF MODE bits 0 and 1 synchronized). These signals include ReSeT FIFO (RSTFIFO-L), LeaRNing ENable signal (LRNEN-L), Delayed RENA (DRENA), Network Violation (NV), FIFO Half Full Synchronized (FIFOHFS-L) and finally raw RENA's delayed by one clock cycle and two clock cycles (SRENA1 and SRENA2 respectively)

The HPFM0 output, for HPF Mode bit 0 synchronized is asserted when HPFMOD0 (HPF Mode Bit 0) Receive Packet signal (RXPKT) is idle. Once asserted, this signal stays asserted as long as RXPKT signal is high.

The HPFM1 output, for HPF Mode bit 1 synchronized, is asserted when: (a) HPFMOD1 (HPF Mode Bit 1) in the Processor Control register is set but HPF Mode bit 0 is still reset and Receive Packet signal (RXPKT) is idle (this is the reset/blocking mode); or (b) HPFMOD1 is set and HPFMOD0 is reset and RXPKT is idle (this corresponds to RESET/LEARN/FORWARD/BLOCK Modes); or (c) HPFMOD0 and HPFMOD2 are set and LRNEN-L is not asserted (this corresponds to the Auto LEARN FORWARD Modes). Once asserted, HPFM1 stays asserted as long as RXPKT signal is high.

The RSTFIFO-L output, for ReSet FIFO, is asserted when HPF mode bits synchronized (HPFM0 and HPFM1) are both low on power up. RSTFIFO-L is used to clear FIFO register 72 and also used to generate RSTHPF-L in PAL 13.

The LRNEN-L output, for LeaRN ENabled, is asserted when the FIFO register 72 is emptied as indicated by the FIFOEF-L flag. Once asserted LRNEN-L remains asserted as long as FIFO 72 is not half full (as indicated by FIFOHF-L flag). Once the FIFO reaches half full, LRNEN-L is negated and remains so until the FIFO once again becomes empty. LRNEN-L is an internal signal used within PAL 14. It appears as an intermediate term in the equations for PAL 14, but not as an input or output. FIFOEF-L and FIFOHF-L are derived from FIFO 72.

The DRENA output, for Delayed Receive ENAble, is asserted when reception of packet is started by RXPKT from PAL 15 and PLL (from PAL 12) is asserted (at the 7th bit count of the counter) given that the hardware prefilter is not in the Reset state. Once asserted, DRENA remains latched as long as RSTHPF-L signal is negated.

The NV output, for Network Violation, occurs at the termination of the interpacket gap timer when the counter is zeroed and raw RENA from SIA 58 (SRENA) is asserted. The width of the interpacket gap is controlled by the IPGE (Interpacket Gap End) output of PAL 12 and hence the EOP-L (End of packet) output of PAL 16 during the Reset HPF time. IPGE is typically set at 6.4 microseconds. Once asserted, the NV signal remains asserted as long as RSTHPF-L is negated.

The FIFOHFS-L output, for FIFO Half Full Synchronized, is asserted during the reception of a packet as indicated by the RXPKT signal, if the FIFO becomes half Full. The FIFOHF-L (FIFO Half Full) output of FIFO 72 is utilized effectively here to make sure that the FIFO does not become full and software has a chance to empty out the packet information from the FIFO.

The SRENA1 and SRENA2 outputs, for Receive ENAble delayed by 1 and 2 clock cycles respectively, are delayed versions of the raw RENA coming out of the SIA. The delay insures that SRENA1 and SRENA2 give a real indication of the start of reception. SRENA1 and SRENA2 create a qualified RENA signal in PAL 15 which is seen by the LANCEs.

The equations for the outputs of PAL 14 are as follows:

| | |
|---|---|
| HPFM0: = | (HPFM0 & RXPKT # HPFMOD0 & !RXPKT); |
| HPFM1: = | (HPFM1 & RXPKT # HPFMOD0 & HPFMOD2 & LRNEN-L # HPFMOD1 & !HPFMOD2 & !RXPKT # !HPFMOD0 & HPFMOD1 & !RXPKT); |
| RSTFIFO-L = | !(!HPFM0 & !HPFM1); |
| LRNEN-L: = | !(FIFOHF-L & !LRNEN-L # !FIFOEF-L); |
| DRENA: = | (DRENA & RSTHPF-L #PLL & RSTHPF-L & RXPKT); |
| NV: = | (NV & RSTHPF-L # !RSTHPF-L & SRENA & ZERO); |
| FIFOHFS-L: = | !(FIFOHFS-L & RSTHPF-L # !FIFOHF-L & RSTHPF-L & RXPKT); |
| SRENA1: = | (SRENA); |
| SRENA2: = | (SRENA1). |

PAL 15

PAL 15 (FIG. 15) generates SYNCFND-L, RXPKT, TXPKT, BADDR, PADDR, MADDR and RENA outputs, as well as internal signals designated RX1 and ISTBIT. All the signals are clocked except Multicast Address (MADDR).

RX1 (Receive data delayed by 1 clock) is a signal used internally in PAL 15. RX1 is high when Receive Data (RX) and Delayed receive enable (DRENA) have occurred. DRENA is an output of PAL 14 and is valid when the RXPKT from PAL 15 is started and PLL from PAL 12 indicates that the phase-locked loop in SIA 58 is locked from the SIA.

The SYNCFND-L output (SYNC FouND) indicates completion of the Preamble (64 Bits) and finding of the SYNC bits (Two 1's in a row). SYNCFND-L is asserted once RX, RX1 and DRENA are asserted during the non-reset state of the HPF.

1ST BIT (FirST rx data BIT), another internal signal, is a result of the occurrence of Delayed receive enable (DRENA) after the phase-locked loop has been locked, RX and RX1 have occurred, but SYNC has not been found. This signal is used to capture the first bit of the frame to assist in determining the type of destination address. If the first bit is "0", the frame has a physical destination address. If the first bit is a "1", the frame has a logical destination address, i.e. the exact destination is not known.

The RXPKT output (Receive PacKeT) is asserted when the Raw receive enable signal SRENA from SIA 58 is asserted, the User Lance Transmit Enable signal (U-TENA) is negated and Transmit packet (TXPKT) is not asserted, indicating that no transmit activity is going on. Once asserted, RXPKT stays asserted as long as the hardware prefilter is not Reset.

The TXPKT output (Transmit PacKeT) is asserted when U-TENA is asserted and RXPKT is not active, indicating that no receive activity is going on. Once asserted, TXPKT stays asserted as long as the hardware prefilter is not Reset.

The BADDR output (Broadcast ADDRess) is asserted when the sync bits are not found, indicating an early part of packet, i.e. the preamble. BADDR is true if all the bits in the destination are "1", but will be negated if any destination address bit is "0".

The PADDR output (Physical ADDRess) indicates the state of the first bit of the destination address of the last frame received. PADDR remains latched as long as 1STBIT is negated.

The MADDR output (Multicast ADDRess) is asserted when neither of PADDR and BADDR is asserted.

The RENA output (Receive ENAble) is the Receive Enable as seen by the LANCEs. Since the raw receive enable (SRENA) from SIA 58 has no guaranteed pulse width, it is qualified in order to meet minimum and maximum time required by the LANCEs. RENA is asserted when EOP-L is inactive and SRENA is asserted. During the EOP-L active time, the RENA signal is negated. This signal also stays asserted during RXPKT period before the post slot time of 512 bit (51.2 microseconds) when either SRENA1 or SRENA2 (SRENA Delayed by 1 and 2 clock cycles respectively) is asserted indicating genuine Receive Enable. Once asserted, RENA stays asserted as long as DRENA and RSTHPF are idle or inactive or as long as U-TENA is active high during EOP-L high time.

The equations for PAL 15 are as follows:

| | |
|---|---|
| RX1: = | (DRENA & RX); |
| SYNCFND-L: = | !(RSTHPF-L & !SYNCFND-L # DRENA & RSTHPF-L & RX & RX1); |
| 1STBIT: = | (DRENA & RX & RX1 & SYNCFND-L); |
| RXPKT: = | (RSTHPF-L & RXPKT # RSTHPF-L & SRENA & !TXPKT & !U-TENA); |
| TXPKT: = | (RSTHPF-L & TXPKT # RSTHPF-L & !RXPKT & U-TENA); |
| BADDR: = | (BADDR & DEST-L # BADDR & RX # SYNCFND-L); |
| PADDR := | (PADDR & !1STBIT # !RX & 1STBIT); |
| MADDR = | (!BADDR & !PADDR); |
| RENA: = | (EOP-L & RENA & U-TENA # !DRENA & EOP-L & RENA & RSTHPF-L & RXPKT # EOP-L & !PST & RXPKT & SRENA2 # EOP-L & !PST & RXPKT & SRENA1 # EOP-L & SRENA). |

PAL 16

PAL 16 (Fig. 16) generates the signals to enable and clear the 10 bit counter (PAL 9). It also generate End of Packet, Slot Error and Idle Line signals.

The CTREN output (CounTeR ENable) can be asserted in number of ways: (a) when the FIFO Reset signal (RSTFIFO-L) is asserted; (b) when Reception of packet (RXPKT) is started but the Delayed RENA (DRENA) has not occurred (The time for PLL to lock is about 800 nanoseconds.); (c) after SYNC has been found but before the end of the slot time period of 512 bits; (d) during a "block collision" time period between counts 509 and 513 after SYNC has been found; and (e) during the End of Packet period.

The CTRCLR-L output (CounTeR CLeaR) can also be asserted in a number of ways: (a) when the FIFO Reset signal is asserted; (b) SYNC has not been found yet but DRENA has occurred (preamble time); and (c) at the start and end of the EOP processing period.

The EOP-L output (End of Packet) can be asserted when the net has gone idle (i.e. absence of all activity in or out) during a valid RX packet or TX packet. Once asserted, the EOP-L remains asserted until RSTHPF-L and ZERO are both asserted.

IL-L (Idle Line-True Low) is an internal signal which is activated when all transmit and receive indicators are inactive. This is a qualified idle indicator. It checks the signal at LANCE 62 and at SIA 58.

The SE output (Slot Error) is asserted if, during the reception of a packet while the hardware prefilter is not in the reset state, raw receive enable (SRENA) goes away during the slot time and non-block collision time indicating a runt frame, or when a collision (CLSN) occurs on the network under the same conditions. Once SE occurs, it remains asserted as long as RSTHPF-L is not asserted.

The equations for PAL 16 are as follows:

| | |
|---|---|
| CTREN = | (!EOP-L<br># !RSTFIFO-L<br># !DRENA & RXPKT<br># !PST & !SYNCFND-L<br># BLKCLSN & !PST & !SYNCFND-L<br># EOP-L & !IL-L & RXPKT<br># EOP-L & !IL-L & TXPKT); |
| CTRCLR-L = | !(!RSTFIFO-L<br># !CTRCLR-L & !EOP-L & !RSTHPF-L<br># !EOP-L & !PGE & !RSTHPF-L<br># EOP-L & !IL-L & RXPKT<br># EOP-L & !IL-L & TXPKT<br># DRENA & EOP-L & IL-L & SYNCFND-L); |
| EOP-L: = | !(!EOP-L & RSTHPF-L<br># !EOP-L & !ZERO<br># !CLSN & !RENA & RXPKT & !SRENA & !U-CLSN & !U-TENA<br># !CLSN & !RENA & !SRENA & TXPKT & !U-CLSN & !U-TENA); |
| IL-L = | !(!CLSN & !RENA & !SRENA & !U-CLSN & !U-TENA); |
| SE: = | (RSTHPF-L & SE<br># !BLKCLSN & !PST & RSTHPF-L & RXPKT & !SRENA<br># !BLKCLSN & CLSN & !PST & RENA & RSTHPF-L & RXPKT). |

PAL 17

PAL 17 (FIG. 17) takes care of inverting three signals, namely a transmit enable signal U-TENA from the user LANCE 62, a transmit enable signal C-TENA from the control LANCE (not shown), and RENA from PAL 15. The inverted signals C-TENA-L, U-TENA-L and RENA-L are used to operate drivers for LED indicators (not shown). PAL 17 generates an enable for the control LANCE transmit and control LANCE collision and late collision signals.

The LCLSN output (Late CoLliSioN) is asserted if, during the reception of packet collision occurs and Post Slot Time has been reached but slot error has not occurred. Once LCLSN occurs, it stays latched until RSTHPF occurs. If a collision occurs (as generated by the SIA) during the first 508 bit times, the LANCE will discard the packet but if collision occurs during 509 to 514 bit times (Late Collision), the hardware prefilter will block this error from getting to the LANCE. This is to insure that the LANCE and HPF are in sync with respect to this error.

The ENC-L output (ENable Control LANCE transmit) is asserted when the control LANCE transmit enable (C-TENA) is asserted but user LANCE TENA (U-TENA) is idle. This signal acts as an enable control for the multiplexer between U-TENA and C-TENA and also the associated transmit data.

The C-CLSN output (Control lance CoLliSioN) is asserted when CLSN (Collision as generated by the SIA) occurs or if the control and user LANCEs try to transmit at the same time.

The equations for PAL 17 are as follows:

| | |
|---|---|
| LCLSN: = | (LCLSN & RSTHPF-L # CLSN & PST & RENA & RSTHPF-L & RXPKT & !SE); |
| C-TENA-L = | !(C-TENA); |
| U-TENA-L = | !(U-TENA); |
| ENC-L = | !(C-TENA & !U-TENA); |
| C-CLSN = | (C-TENA & U-TENA # CLSN); |
| RENA-L = | (!RENA). |

PAL 18

PAL 18 (FIG. 18) sends a qualified collision (U-CLSN) to the user LANCE and also generates an abort packet (ABTPKT) signal to abort the frame under various conditions. The inputs of PAL 18 are all derived from other PALs except for RCLK2, GATD, U-TENA, CLSN and C-TENA. C-TENA (control LANCE Transmit ENAble) is derived from the control LANCE (not shown).

The U-CLSN output (User Lance CoLliSioN) is generated and sent to the user LANCE 62 under the following conditions: (a) When Slot Error occurs due to a RUNT packet or a collision occurs during the time when RENA is asserted; (b) when Network Collision occurs while collisions are not blocked (up to bit time of 509); (c) When user and Control Lance try to transmit at the same time (on board collision); (d) During the reset time if RENA and RXPKT are asserted indicating packet reception when both mode bits synchronized are low; (e) During packet reception if the FIFO 72 becomes full; (f) During Abort packet time when the packet is to be filtered; (g) If a network violation occurred during RXPKT. Once U-CLSN is active, for any of the above reasons, it remains asserted as long as RENA is asserted.

The ABTPKT output (ABorT PacKeT) can be asserted if any or all of the following is true: (a) HPF Mode bits synchronized 0 and 1 are 0 and 1 respectively during the reception of a frame. (This depicts BLOCKING Mode); (b) Mode bits 0 and 1 both are 1's, the net address is a Broadcast address, ADDRIN is asserted (meaning that the source and destination addresses are in) and finally HPFFB (the HPF Forward Broadcast packet bit) is set during RXPKT. This depicts Forwarding mode with filtering of Broadcast packets; (c) Mode bits 0 and 1 both are 1's, the net address is a Multicast address, the prefilter has already read GAT data (and the value is 0), and finally HPFFM (HPF Forward Multicast packet bit) is set during receive packet. This depicts Forwarding mode with filtering of Multicast packets; (d) Mode bits 0 and 1 both are 1's, the net address is Physical address, HPF has already read Global Address table data (and the value is 0), during RXPKT. This depicts Forwarding mode with filtering of physical packets. Once ABTPKT is asserted for any of the above reasons, it stays asserted as long as the RXPKT signal is asserted.

The HPFFM input (Hardware Prefilter Forward Multicast packets) and the HPFFB input (Hardware Prefilter Forward Broadcast packets) input are derived from the process control register. The equations for PAL 18 are as follows:

| | |
|---|---|
| U-CLSN: = | (RENA & U-CLSN |
| | # NV & RENA & RXPKT |
| | # ABTPKT & RENA |
| | # !FIFOHFS-L & RENA & RXPKT |
| | # !HPFMO & !HPFM1 & RENA & RXPKT |
| | # !BLKCLSN & C-TENA & U-TENA |
| | # !BLKCLSN & CLSN |
| | # RENA & SE); |
| ABTPKT: = | (ABTPKT & RXPKT |
| | # !GATD & !GOTGAT-L & HPFMO & HPFM1 & PADDR & RXPKT |
| | # !GATD & !GOTGAT-L & HPFFM & HPFMO & HPFM1 & MADDR & RXPKT |
| | # ADDRIN & BADDR & HPFFB & HPFMO & HPFM1 & RXPKT |
| | # !HPFMO & HPFM1 & RXPKT). |

PAL 10

PAL 10 (FIG. 19) operates from a processor clock signal PCLK3, and produces outputs designated HPFREQ-L, PPAS-L, PLDS-L, READGATD, HPFAOE-L and GOTGAT-L. The primary function of PAL 10 is to provide the signalling to the memory section that a memory read operation is taking place.

The HPFREQ-L output (Hardware Prefilter REQesting bus) goes to a local bus arbiter to request the use of the processor bus.

The PPAS-L output (Processor Address Strobe) and the PLDS-L output (Processor Lower Data Strobe) are strobe signals used by the bus devices.

The READGAT-D output (READ Global Address Table Data) is a read strobe which is delivered through line 91 to latch the GAT cell data on line 98.

The HPFAOE-L output (Hardware Prefilter Output Enable) is delivered by line 85 to address buffer 84 to enable the buffer to drive the GAT memory during a read of the GAT 82.

The GOTGAT-L output (GOT Global Address Table data) informs the hardware prefilter, via PAL 18, that the GAT data has been read and is available for processing.

The GETGAT-L input is derived from PAL 12. The HPFGNT (Hardware Prefilter GraNT) input is generated by a local bus arbiter and indicates when the local processor bus is free for use by the hardware prefilter for reading of the GAT section of the memory. The PDATCK-L input (Processor DAta Transfer aCKnowledge) input is derived from multiple devices within the bridge, and signifies that data placed on the bus has been accepted.

The equations for PAL 10 are as follows:

```
HPFREQ: =      !(!GETGAT & GOTGAT & !READGATD);
HPFAOE: =      !(!GETGAT & GOTGAT & !HPFGNT &
               !HPFREQ & !READGATD);
GOTGAT: =      !(!GETGAT & !GOTGAT # !GETGAT &
               !HPFGNT & READGATD);
enable PPAS =  (!GETGAT & !HPFGNT & !HPFREQ);
PPAS: =        !(!CO & GOTGAT & !HPFAOE &
               !HPFGNT);
enable PLDS =  (!GETGAT & !HPFGNT &
               !HPFREQ);
PLDS: =        !(!CO & GOTGAT & !HPFAOE &
               !HPFGNT);
READGATD: =    (CO);
CO: =          (!GETGAT & !HPFAOE & !HPFGNT &
               !PDTACK).
```

While the invention has been described with reference to a specific protocol, namely "Ethernet", it should be understood that the principles of the invention can be utilized in bridges designed to operate under other protocols such as "StarLAN", "Token Ring", etc. Other LAN communications controllers can be used in place of the LANCE devices. Address tables in local memory and the local address table can be established and updated in a variety of ways, both automatic and manual. The CRC generators, which are preferably embodied in programmed array logic, can be made up of discrete logic elements or embodied in other forms including, for example, custom gate arrays or even software-implemented forms. The invention can be realized in numerous other embodiments, and with numerous modifications, all of which can be made without departing from its intended scope as defined in the following claims.

I claim:

1. In a data communications system in which communication takes place by the transmission of message frames, each frame including a destination address portion, the system comprising a first local area network interconnected with a network set, said set comprising at least one local area network, and all of the networks of said set being networks other than said first network, bridge means associated with said first local area network for interconnecting the first local area network with each local area network of said set and transmitting message frames, originating in said first local area network, from said first local area network to one or more of the local area networks of said set, said bridge means comprising:
   memory means storing data indicating whether each address in a set of addresses corresponds to a device active on a local area network of said network set;
   means responsive to the destination address portions of message frames originating in said first local area network for addressing said memory means; and
   means responsive to the addressed data in said memory means for preventing each frame originating in said first local area network from being transmitted to any of the networks of said network set when the destination address of said frame does not correspond to a device active on a network of said network set.

2. Bridge means according to claim 1 in which said memory means comprises a plurality of addressable memory cells, each cell having an address corresponding to an address in said set of addresses, and in which said means responsive to the destination address portions of message frames includes means for generating abbreviated representations of said destination address portions and using said abbreviated representations to address said memory means.

3. Bridge means according to claim 2 in which the address of each cell represents a plurality of device addresses.

4. Bridge means according to claim 1 in which said means responsive to the destination address portions of message frames comprises a cyclic redundancy check generator.

5. For use in a data communications network, a bridging device for interconnecting a first local area network with one or more other local networks through an interconnecting link comprising:
   memory means establishing a global address table containing memory cells, each cell having a unique address, each cell address representing at least one device address, and each cell having a first possible state representing that the device addresses to which it corresponds have not been sensed outside said first local area network and a second possible state representing that the device addresses to which it corresponds have been sensed outside said first local network, means for generating a representation of the destination address of each message frame transmitted in said first local area network, means for receiving said representation and using said representation to address the global address table, and means responsive to the state of each addressed memory cell in the global address table to prevent transmission of the frame through said interconnecting link if the addressed memory cell is in the first possible state.

6. A bridging device according to claim 5 in which each cell address represents a plurality of device addresses in accordance with a predetermined hash coding formula.

7. A bridging device according to claim 6 in which the memory means is a byte-wide RAM with individually addressable memory bytes in which each byte is constituted by multiple bits of address information and in which the means for generating a representation of the destination address of each message frame generates its output in the form of a plurality of parallel bits a first group of which are connected to address the RAM, and decoding means receiving the RAM output and a second group of said parallel bits, and selecting, from said RAM output, a single bit of information, said single bit corresponding to said addressed memory cell.

8. For use in a data communications network, a bridging device for interconnecting a first local area network with one or more other local networks through an interconnecting link comprising:
   processing means for receiving and analyzing address portions of message frames transmitted by devices on said first local area network and for passing selected packets to the interconnecting link;
   memory means establishing a global address table containing memory cells, each cell having a unique address, each cell address representing at least one device address in accordance with a predetermined formula, and each cell having a first possible state representing that the device addresses to which it corresponds have not been sensed outside said first local area network and a second possible state representing that the device addresses to which it corresponds have been sensed outside said first local network, means for generating a representation of the destination address of each message frame transmitted in said first local area network using the same formula, means for receiving said representation and using said representation to address the global address table, and means responsive to the state of each addressed memory cell in the global address table to permit analysis of address information in said message frame by the processing means if the addressed memory cell is in said second possible state, and to prevent analysis of address information in said message frame by the processing means if the addressed memory cell is in the first possible state.

9. A bridging device according to claim 8 in which each cell address represents a plurality of device addresses in accordance with a predetermined hash coding formula.

10. A bridging device according to claim 9 in which the memory means is a byte-wide RAM with individually addressable memory bytes in which each byte is constituted by multiple bits of information and in which the means for generating a representation of the destination address of each message frame generates its output in the form of a plurality of parallel bits a first group of which are converted to address the RAM, and decoding means receiving the RAM output and a second group of said parallel bits, and selecting, from said RAM output, a single bit of information, said single bit corresponding to said addressed memory cell.

11. A bridging device according to claim 8 including:
global memory means;
local area network communications controller means, responsive to the state of the addressed memory cell in the global address table, for forwarding a message frame to the global memory if the memory cell addressed by the use of a representation of the destination address of said message frame is in said second possible state, said controller means also maintaining a set of pointers for locating message frames stored in said global memory;
local memory means, associated with said processing means, for storing addresses of devices on the data communications network along with an index based at least in part on abbreviated representations of said addresses;
first-in, first-out register means for temporarily storing a stack of representation of addresses, including abbreviated representations produced by said generating means;
said processing means sequentially locating and retrieving frames from said global memory by means of pointers maintained in said global memory, simultaneously with each retrieval, reading an abbreviated address representation from said first-in, first-out register and using the abbreviated representation to locate a set of addresses stored in the local memory means, and comparing address information from the retrieved frame with said set of addresses.

12. A bridging device according to claim 11 including means establishing a limit on the contents of said first-in, first-out register, and preventing said local area network communications controller means from forwarding frames to said global memory when said limit is exceeded.

13. A bridging device according to claim 11 including means for detecting a condition in which the local area network communications controller means and the first-in, first-out register are out of synchronization, and for resetting the first-in, first-out register and purging the pointers maintained in the global memory when such a condition occurs.

14. A bridging device according to claim 11 including means for preventing the first-in, first-out register from storing a representation of the address portion of a frame if a collision signal is received by the bridging device before a first predetermined time following the beginning of reception of the message frame, in which the local area network communications controller means includes means for receiving collision signals and for preventing each frame from being forwarded to the global memory means when a collision signal is received by the controller means before a second predetermined time following the beginning of reception of the message frame by the bridging device, in which said second time is later than said first time, and means operable during an interval from said first time until after said second time from preventing a collision signal received by said bridging device from reaching said controller means.

15. A method of selectively transmitting message frames from devices on a first local area network to devices on one or more other local area networks interconnected with said first network through a bridge, comprising the steps of:
determining, by filtering means in said bridge, whether destination address portions of frames generated in said first network do not correspond to addresses of devices on said other networks; and
discarding, in said bridge, frames the destination address portions of which have no corresponding device addresses on said other networks.

16. The method of claim 15 in which said step of determining whether destination address portions of frames generated in said first network do not correspond to addresses of devices on said other networks is carried out by generating non-unique representations of destination address portions of said frames, and using said non-unique representations to address a memory table containing data indicating whether or not devices having addresses corresponding to said non-unique representations are active on said other networks.

17. The method of claim 16 in which said step of determining whether destination address portion of frame generated in said first network do not correspond to addresses of devices on said other networks is followed by a further filtering step.

* * * * *

UNITED STATES PATENT AND TRADEMARK OFFICE
CERTIFICATE OF CORRECTION

PATENT NO. : 4,922,503

DATED : May 1, 1990

INVENTOR(S) : Mario J. Leone

It is certified that error appears in the above-identified patent and that said Letters Patent is hereby corrected as shown below:

Column 11, line 54, "pALs" should read --PALs--

Column 12, line 17, "-5," should read --0-15,--.

Column 15, line 30, after "BitO)" insert --from processor control register 107 is set and the--.

Signed and Sealed this

Twenty-third Day of July, 1991

Attest:

HARRY F. MANBECK, JR.

*Attesting Officer*     *Commissioner of Patents and Trademarks*